(12) United States Patent
Jessen

(10) Patent No.: US 11,490,559 B2
(45) Date of Patent: Nov. 8, 2022

(54) STEERING ASSISTANCE SYSTEMS, ROLL CONTROL SYSTEMS, AND VEHICLES HAVING THE SAME

(71) Applicant: Thomas F. Jessen, Valparaiso, IN (US)

(72) Inventor: Thomas F. Jessen, Valparaiso, IN (US)

(73) Assignee: Perma-Green Supreme, Inc., Valparaiso, IN (US)

(*) Notice: Subject to any disclaimer, the term of this patent is extended or adjusted under 35 U.S.C. 154(b) by 1080 days.

(21) Appl. No.: 16/042,593

(22) Filed: Jul. 23, 2018

(65) Prior Publication Data

US 2019/0021217 A1    Jan. 24, 2019

Related U.S. Application Data

(60) Provisional application No. 62/535,344, filed on Jul. 21, 2017.

(51) Int. Cl.

| | |
|---|---|
| A01C 15/00 | (2006.01) |
| B62D 12/00 | (2006.01) |
| B62K 17/00 | (2006.01) |
| B62K 5/01 | (2013.01) |
| B62K 7/04 | (2006.01) |
| A01C 15/02 | (2006.01) |

(52) U.S. Cl.
CPC .............. *A01C 15/00* (2013.01); *B62D 12/00* (2013.01); *B62K 5/01* (2013.01); *B62K 7/04* (2013.01); *B62K 17/00* (2013.01); *A01C 15/02* (2013.01)

(58) Field of Classification Search
CPC ...... B62D 12/00; B62D 51/008; B62D 12/02; B62D 53/0871; B62D 53/0878; B62D 53/0885; B62D 6/003; B62K 7/04; B60D 1/30; B60D 1/32; B60D 1/34; A01C 15/00
See application file for complete search history.

(56) References Cited

U.S. PATENT DOCUMENTS

| | | | | |
|---|---|---|---|---|
| 2,459,965 A | * | 1/1949 | Robertson | B60D 1/07 280/489 |
| 2,549,814 A | * | 4/1951 | Hume | B60D 1/34 280/461.1 |
| 2,701,145 A | * | 2/1955 | Kunz | B60D 1/34 280/446.1 |
| 2,709,604 A | * | 5/1955 | Hartman | B60D 1/34 280/406.1 |
| 2,729,467 A | * | 1/1956 | Reese | B60D 1/34 280/406.2 |
| 2,822,188 A | * | 2/1958 | Begin | B60D 1/34 280/432 |

(Continued)

*Primary Examiner* — Jacob B Meyer
*Assistant Examiner* — Conan D Duda
(74) *Attorney, Agent, or Firm* — Hartman Global IP Law; Gary M. Hartman; Domenica N. S. Hartman

(57) ABSTRACT

Steering and roll control systems to counteract yaw and/or roll forces during operation of a vehicle having first and second wheeled members coupled together by an articulating joint mechanism that is configured to pivot in a yaw direction and/or a roll direction. The steering assistance systems include a biasing unit configured to apply a counteracting force to bias the first and second wheeled members toward a straight-line arrangement thereof. The roll control systems include an additional biasing unit configured to apply a counteracting force to bias the first and second wheeled members toward a level alignment arrangement of the vehicle.

24 Claims, 15 Drawing Sheets

(56) References Cited

U.S. PATENT DOCUMENTS

| | | | | |
|---|---|---|---|---|
| 2,843,417 A * | 7/1958 | Wahl | B60D 5/00 | 280/403 |
| 2,847,231 A * | 8/1958 | Miller | B60D 1/34 | 280/483 |
| 2,885,021 A * | 5/1959 | Routledge | B62D 12/00 | 180/420 |
| 2,896,734 A * | 7/1959 | Toth | B62D 53/02 | 180/420 |
| 3,082,019 A * | 3/1963 | Begin | B62D 53/0871 | 280/432 |
| 3,096,844 A * | 7/1963 | Sittel | B62D 7/00 | 180/420 |
| 3,119,630 A * | 1/1964 | Oliver | B62D 12/02 | 280/402 |
| 3,305,246 A * | 2/1967 | Gonczy | B60D 1/32 | 280/455.1 |
| 3,414,072 A * | 12/1968 | Hodges, Jr. | B62D 5/09 | 180/24 |
| 3,623,750 A * | 11/1971 | Allen | B60D 1/32 | 280/455.1 |
| 3,825,281 A * | 7/1974 | Howard | B62D 53/04 | 280/423.1 |
| 3,831,693 A * | 8/1974 | King | B62D 53/04 | 180/14.4 |
| 3,837,678 A * | 9/1974 | Cicero | B62D 53/0878 | 280/432 |
| 3,850,449 A * | 11/1974 | Link | B62D 53/0878 | 280/432 |
| 3,856,329 A * | 12/1974 | Ordorica | B62D 53/0878 | 280/432 |
| 3,994,510 A * | 11/1976 | Howard | B62D 53/04 | 280/432 |
| 4,135,597 A * | 1/1979 | Barth | B62D 12/00 | 180/41 |
| 4,155,408 A * | 5/1979 | Welborn | A01B 39/06 | 172/257 |
| 4,192,525 A * | 3/1980 | Clark | B62D 51/008 | 180/11 |
| 4,262,920 A * | 4/1981 | Mettetal | B62D 53/00 | 280/408 |
| 4,281,847 A * | 8/1981 | Robe | B60D 1/243 | 280/455.1 |
| 4,312,516 A * | 1/1982 | Olsen | B60D 1/247 | 280/406.2 |
| 4,402,522 A * | 9/1983 | Ratsko | B62D 12/00 | 280/432 |
| 4,420,169 A * | 12/1983 | Taylor | B60D 1/06 | 280/446.1 |
| 4,494,765 A * | 1/1985 | Ratsko | B62D 53/0871 | 280/432 |
| 4,502,561 A * | 3/1985 | Kober | B60D 1/06 | 280/455.1 |
| 4,549,746 A * | 10/1985 | Hager | B60D 1/50 | 280/450 |
| 4,564,208 A * | 1/1986 | Kudler | B62D 53/0871 | 267/138 |
| 4,582,337 A * | 4/1986 | Hsueh | B60D 1/34 | 280/455.1 |
| 4,596,399 A * | 6/1986 | Clark | B60D 1/50 | 280/476.1 |
| 4,645,226 A * | 2/1987 | Gustavsson | B60D 1/30 | 172/450 |
| 4,700,966 A * | 10/1987 | Hawkins | B62D 53/0878 | 280/432 |
| 4,784,403 A * | 11/1988 | Hawkins | B62D 53/0878 | 280/432 |
| 4,890,684 A * | 1/1990 | Simmons | B62D 12/00 | 180/419 |
| 4,993,738 A * | 2/1991 | Bennett | B60D 1/30 | 280/432 |
| 5,081,933 A * | 1/1992 | Lapp | B61F 5/44 | 105/168 |
| 5,137,107 A * | 8/1992 | Uttenthaler | B62D 53/0878 | 180/235 |
| 5,209,320 A * | 5/1993 | Harrer | A01M 7/0082 | 180/235 |
| 5,348,331 A * | 9/1994 | Hawkins | B60D 1/322 | 280/455.1 |
| 5,520,404 A * | 5/1996 | Schulte | B60D 1/173 | 280/460.1 |
| 5,947,503 A * | 9/1999 | Tompkins | B62D 53/0871 | 280/455.1 |
| 5,957,476 A * | 9/1999 | Simpson | B62D 53/0871 | 280/432 |
| 6,062,582 A | 5/2000 | Martin | | |
| 6,336,600 B1 | 1/2002 | Jessen | | |
| 6,339,917 B1 * | 1/2002 | Dillon | A01D 41/02 | 460/114 |
| 6,345,932 B1 * | 2/2002 | Fix | B62D 12/00 | 180/419 |
| 6,485,046 B1 * | 11/2002 | Hsueh | B60D 1/065 | 280/455.1 |
| 6,488,291 B1 * | 12/2002 | Bellis, Jr. | B62D 49/065 | 280/32.7 |
| 6,637,760 B1 | 10/2003 | Carman | | |
| 7,261,312 B1 * | 8/2007 | Joplin | B60D 1/247 | 280/446.1 |
| 7,712,751 B2 | 5/2010 | Beal | | |
| 7,784,812 B1 * | 8/2010 | Lares | B62D 49/0678 | 280/474 |
| 7,954,573 B2 * | 6/2011 | Jessen | B60F 3/0007 | 180/6.32 |
| 9,540,058 B1 * | 1/2017 | Houston | A01D 34/00 | |
| 10,131,380 B1 * | 11/2018 | Simmons | B62D 53/021 | |
| 2003/0137125 A1 * | 7/2003 | Booysen | B60D 1/30 | 280/459 |
| 2005/0039973 A1 * | 2/2005 | Clark | B62D 12/00 | 180/418 |
| 2006/0113136 A1 * | 6/2006 | Donaldson | B60K 17/356 | 180/242 |
| 2006/0138746 A1 * | 6/2006 | Donnard | B60D 1/242 | 280/492 |
| 2006/0261573 A1 * | 11/2006 | Hsueh | B60D 1/30 | 280/455.1 |
| 2007/0114759 A1 * | 5/2007 | Biondi | B62D 53/0871 | 280/477 |
| 2009/0008905 A1 * | 1/2009 | Bryce | B60D 1/32 | 280/498 |
| 2010/0003872 A1 * | 1/2010 | Jessen | B60F 3/0007 | 440/12.5 |
| 2010/0025963 A1 * | 2/2010 | Staude | B62D 53/0842 | 280/432 |
| 2010/0181743 A1 * | 7/2010 | Timmons, Jr. | B60D 1/30 | 280/442 |
| 2010/0327558 A1 * | 12/2010 | Lares | B62D 61/12 | 280/415.1 |
| 2011/0115196 A1 * | 5/2011 | Wulff | B60D 1/32 | 280/477 |
| 2014/0246257 A1 * | 9/2014 | Jacobsen | B62D 55/0655 | 180/14.2 |
| 2015/0076800 A1 * | 3/2015 | Davis | B62D 63/061 | 280/656 |
| 2016/0114833 A1 * | 4/2016 | Hukkanen | B60G 5/02 | 280/785 |
| 2018/0208259 A1 * | 7/2018 | van Wijk | B62D 11/003 | |
| 2019/0210646 A1 * | 7/2019 | Shepherd | B62D 7/228 | |
| 2019/0217676 A1 * | 7/2019 | Blackwell | B60D 1/54 | |
| 2020/0062306 A1 * | 2/2020 | Shoshan | B60D 1/173 | |
| 2021/0391769 A1 * | 12/2021 | Picchi | H02J 15/006 | |

* cited by examiner

STEERING ASSISTANCE SYSTEMS, ROLL CONTROL SYSTEMS, AND VEHICLES HAVING THE SAME

CROSS REFERENCE TO RELATED APPLICATIONS

This application claims the benefit of U.S. Provisional Application No. 62/535,344 filed Jul. 21, 2017, the contents of which are incorporated herein by reference.

BACKGROUND OF THE INVENTION

The present invention generally relates to self-propelled vehicles of the types used in the lawn care industry for material spreading activities such as spreading fertilizer or herbicide. The invention particularly relates to systems capable of providing steering assistance and/or roll control during the operation of such vehicles.

Ride-on self-propelled lawn care equipment, such as fertilizer and herbicide spreaders, are known and commercially available. A notable example is the Perma-Green Triumph, available from Perma-Green Supreme Inc., which utilizes an articulated steering system to turn the vehicle by physically turning its self-propelled front end (motorized with drive wheels) to cause the front end to articulate relative to a trailing end (sulky) on which an operator is able to stand. Another example is a self-propelled fertilizer spreader vehicle disclosed in U.S. Pat. No. 6,336,600 to Jessen, incorporated herein by reference.

Articulating joint mechanisms of the type referenced above typically provide the following functions: steering the front end in the right and left (yaw) directions relative to the longitudinal axis of the vehicle and about a vertical pivot located between the front end and sulky; maintaining stability and tire to ground contact on uneven surfaces by permitting limited relative rotational (roll) movement between the front end and sulky about a horizontal pivot located along the longitudinal axis of the vehicle, and maintaining a constant horizontal alignment between the front and rear portions of the vehicle by preventing up or down movement (pitch) about a horizontal transverse pivot between the front end and sulky.

Attempts have been made to add power assist systems to existing articulating joint mechanisms to reduce the physical exertion of the operator and improve control when maneuvering, especially when the vehicle is fully loaded and operating on uneven terrain. An exemplary power assist system is disclosed in U.S. Pat. No. 7,954,573, which is incorporated herein by reference, and commercially available from Perma-Green Supreme, Inc. under the name PermaGreen Triumph. While not intending to be limited to any particular interpretation, this system utilizes a synchronized two-lever drive-steering control system in combination with the aforementioned articulating joint mechanism.

Despite the improvements provided by the Perma-Green Triumph and other available vehicles, there is an ongoing demand for systems capable of improving the steering of such vehicles in order to improve operator comfort, safety, and vehicle control, especially on vehicles that have a high center of gravity.

BRIEF DESCRIPTION OF THE INVENTION

The present invention provides steering assistance systems and roll control systems suitable for improving the steering and handling of vehicles that comprise wheeled members connected by an articulating joint. The present invention further encompasses vehicles comprising such systems.

According to one aspect of the invention, a steering assistance system is provided for a vehicle comprising first and second wheeled members coupled together by an articulating joint mechanism having a longitudinal centerline aligned with a longitudinal axis of the vehicle when the first and second wheeled members are in a straight-line arrangement as a result of the vehicle tracking in a straight-line forward direction. The articulating joint mechanism has a vertical pivot axis disposed on the longitudinal centerline thereof that enables the first and second wheeled members to articulate relative to each other in oppositely-disposed first and second yaw directions relative to the longitudinal axis of the vehicle. The steering assistance system includes a biasing unit configured to span the articulating joint mechanism such that a longitudinal axis of the biasing unit is vertically aligned with the longitudinal centerline of the articulating joint mechanism and is intersected by the vertical pivot axis of the articulating joint mechanism when the first and second wheeled members are in the straight-line arrangement thereof. When the articulating joint mechanism pivots about the vertical pivot axis thereof in either of the first and second yaw directions, the biasing unit applies a counteracting force to bias the first and second wheeled members toward the straight-line arrangement thereof.

According to another aspect of the invention, a roll control system is provided for a vehicle comprising first and second wheeled members coupled together by an articulating joint mechanism having a longitudinal centerline aligned with a longitudinal axis of the vehicle when the first and second wheeled members are in a straight-line arrangement as a result of the vehicle tracking in a straight-line forward direction. The articulating joint mechanism has a vertical pivot axis disposed on the longitudinal centerline thereof that enables the first and second wheeled members to articulate relative to each other in oppositely-disposed first and second yaw directions relative to the longitudinal axis of the vehicle. The articulating joint mechanism also has a horizontal pivot axis disposed on the longitudinal centerline thereof that enables the first and second wheeled members to rotate relative to each other in oppositely-disposed first and second roll directions around the longitudinal axis of the vehicle and relative to a level alignment arrangement of the vehicle. The roll control system includes a biasing unit configured to apply, when the articulating joint mechanism pivots about the horizontal pivot axis thereof in either of the first and second roll directions, a force to bias the first and second wheeled members toward the level alignment arrangement of the vehicle.

According to another aspect of the invention, a vehicle is provided that includes first and second wheeled members coupled together by an articulating joint mechanism and at least one biasing unit located along a longitudinal centerline of the articulating joint mechanism and/or along a longitudinal axis of the vehicle. A first end of the biasing unit is coupled to the first wheeled member and a second end of the biasing unit is coupled to the second wheeled member. The biasing unit biases the articulating joint mechanism when the vehicle turns as a result of the first and second wheeled members being articulated relative to each other, thereby biasing the vehicle to travel in a straight-line forward direction.

Another aspect of the invention is the vehicle described above further having a roll control system that includes a second biasing unit and the ability to couple the second biasing unit adjacent to the articulating joint mechanism, which is further configured to enable the first and second wheeled members to rotate relative to each other in oppositely-disposed first and second roll directions around the longitudinal axis of the vehicle and relative to a level alignment arrangement of the vehicle. When the first and second wheeled members rotate relative to each other in either of the first and second roll directions, the second biasing unit applies a counteracting force to bias the first and second wheeled members toward the level alignment arrangement of the vehicle.

Technical effects of the systems and vehicle described above preferably include the capability of operating a vehicle comprising either or both of the steering assistance and roll control systems with improved handling due to the systems automatically and actively counteracting biasing forces occurring in the yaw and/or roll directions of the vehicle.

Other aspects and advantages of this invention will be further appreciated from the following detailed description.

DETAILED DESCRIPTION OF THE INVENTION

Figure 1:
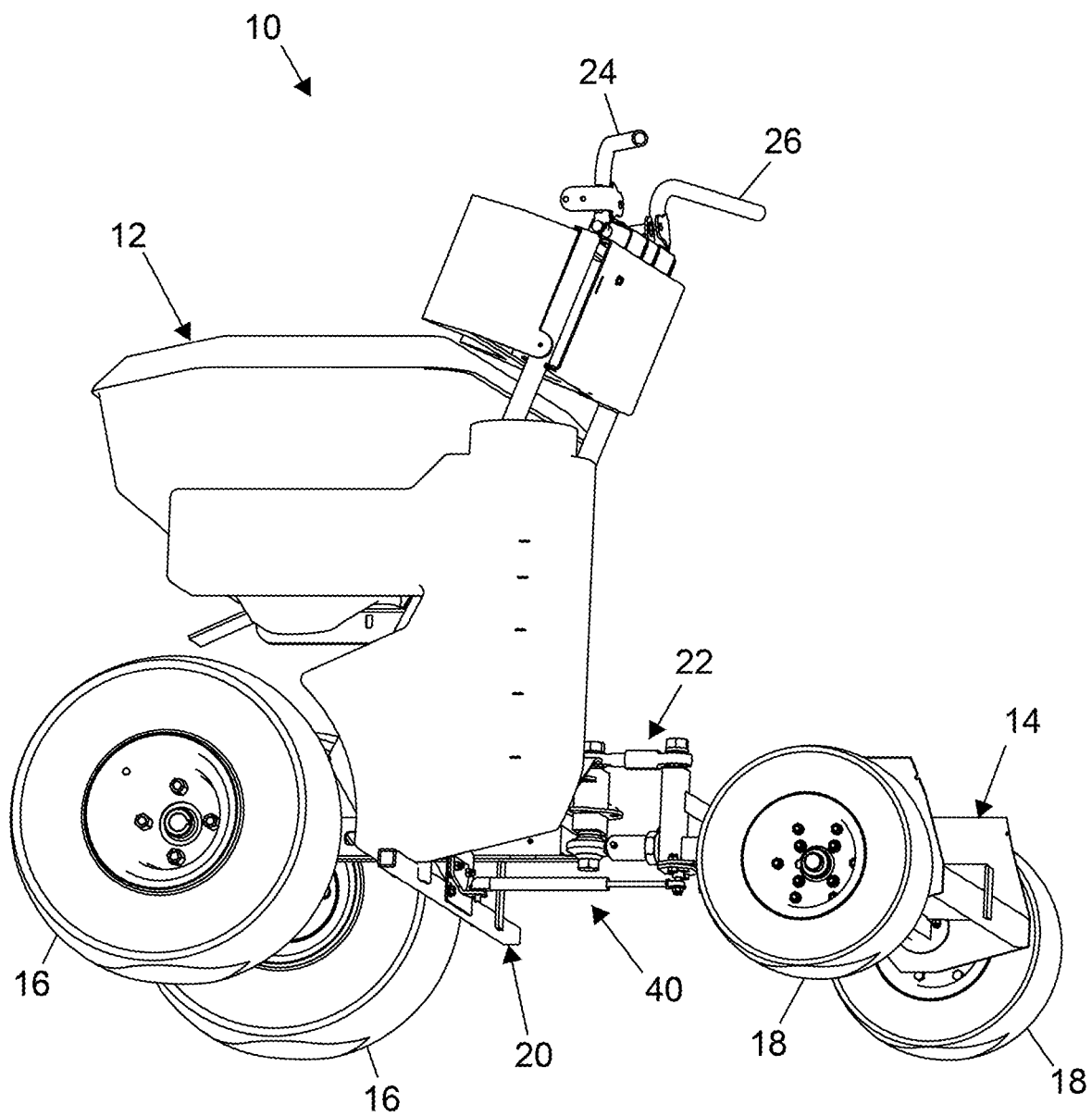
FIG. 1 is a perspective view schematically representing a vehicle having a self-propelled front member, a trailing rear member, and a steering assistance system in accordance with a first nonlimiting embodiment of this invention.

FIGS. 1 through 15 represent self-propelled vehicles 10 and components thereof having steering assistance systems and/or roll control systems in accordance with various nonlimiting aspects of the invention. Best viewed in FIGS. 1, 5, and 8, the vehicles 10 are similar in general construction to those commonly used in the lawn care industry for material spreading activities such as spreading fertilizer or herbicide which conventionally include manually powered steering systems. As such, the following discussion will focus primarily on certain aspects of the vehicles 10 relating to articulating joints that couple front and rear wheeled members of the vehicle 10. Other systems and components not discussed in any detail, in terms of structure, function, materials, etc., are known in the art and therefore not discussed further herein.

To facilitate the description provided below of the vehicles 10 and components thereof represented in the drawings, relative terms, including but not limited to, "vertical," "horizontal," "lateral," "front," "rear," "side," "forward," "rearward," "upper," "lower," "above," "below," "right," "left," etc., may be used in reference to an orientation of the vehicles during their operation, and therefore are relative terms that indicate the construction, installation and use of the invention and therefore help to define the scope of the invention. In addition, certain components of the vehicles 10, such as an engine, are excluded from the figures for clarity. For convenience, consistent reference numbers are used throughout the drawings to identify the same elements of the different embodiments of the vehicles 10.

The vehicle 10 represented in FIG. 1 includes a front wheeled member 12 having a propulsion system (not shown), such that the front wheeled member 12 is referred to herein as the self-propelled member 12. The self-propelled member 12 is represented as having a pair of front wheels 16 (at least one of which is powered) and a chassis frame 20. The vehicle 10 is further represented as comprising a rear or trailing wheeled member, referred to herein as a sulky 14, having a pair of wheels 18 that support a platform upon which an operator may stand. An articulating joint mechanism 22 operably connects the self-propelled member 12 and sulky 14. A handle bar assembly including right and left handle bars 24 and 26, respectively, are operably affixed to the self-propelled member 12 for manual steering of the vehicle 10. When the vehicle 10 is traveling in the straight-line (i.e., nonturning) forward direction, the self-propelled member 12 and sulky 14 are said to be in straight-line arrangement. As will be discussed below, the articulating joint mechanism 22 has a longitudinal centerline aligned with a longitudinal axis of the vehicle 10 when the self-propelled member 12 and sulky 14 are in straight-line arrangement, and a vertical pivot axis disposed on its longitudinal centerline that enables the self-propelled member 12 and sulky 14 to articulate relative to each other in oppositely-disposed yaw directions relative to the longitudinal axis of the vehicle 10. The articulating joint mechanism 22 also preferably has a horizontal pivot axis disposed on its longitudinal centerline that enables the self-propelled member 12 and sulky 14 to rotate relative to each other in oppositely-disposed roll directions around the longitudinal axis of the vehicle 10 and relative to what will be referred to herein as a level alignment arrangement of the vehicle 10, which occurs when there is no roll of the self-propelled member 12 and sulky 14 relative to each other, e.g., when the entire vehicle 10 is resting or traveling over a flat surface, or at least the wheels 16 and 18 of the self-propelled member 12 and sulky 14 are contacting surfaces that lie in the same plane.

Figure 2:
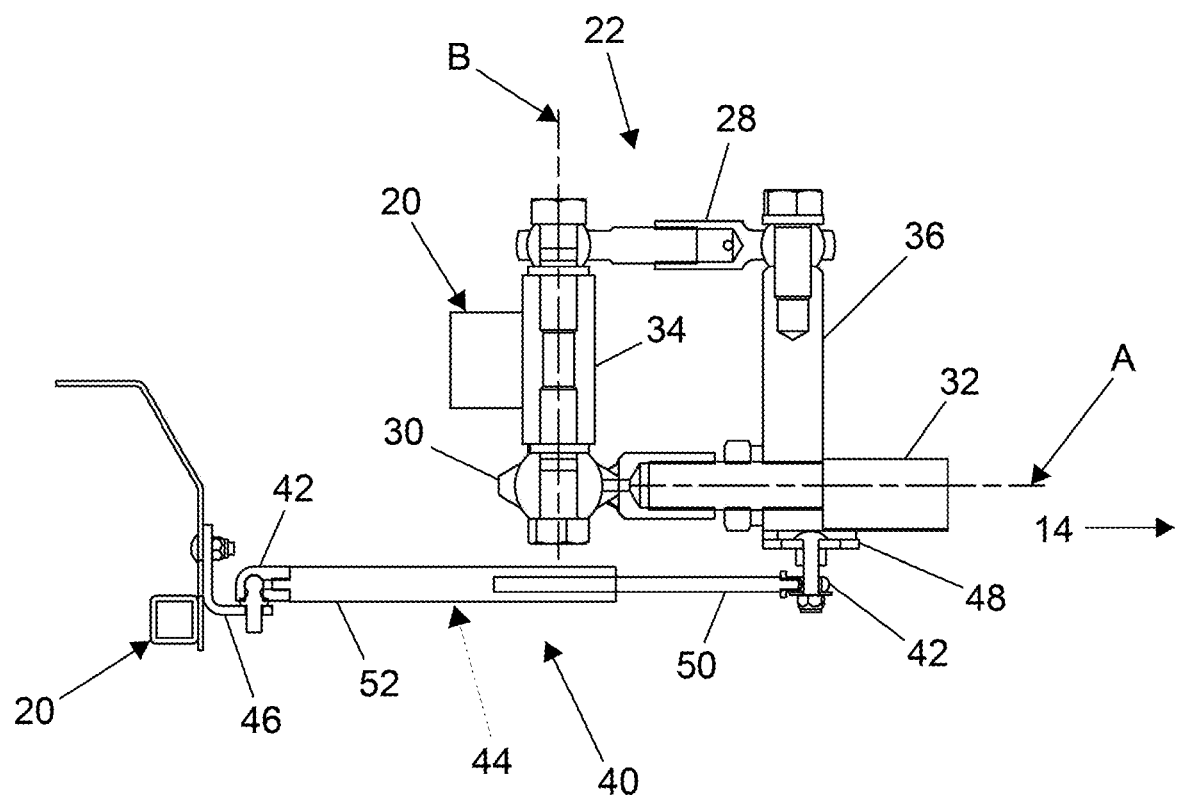
FIG. 2 is a side view of the steering assistance system and an articulating joint mechanism coupling the front and rear members of the vehicle of FIG. 1.

In FIGS. 1 through 7, the self-propelled member 12 and sulky 14 are coupled by the articulating joint mechanism 22 in a manner similar to mechanisms disclosed in U.S. Pat. No. 6,336,600, incorporated herein by reference. Referring to FIG. 2, the articulating joint mechanism 22, which for convenience will be referred to herein as a dual column-type articulating joint mechanism 22, includes an upper connecting linkage 28 with spherical rod ends affixed by bolts or pins to the frame 20 and to the sulky 14. A lower pivot spherical rod end 30 protrudes from a tongue 32 of the sulky 14 orientated along the longitudinal centerline "A" of the mechanism 22 (FIG. 2), and is secured to the frame 20 with a bolt or pin. A pair of separating columns 34 and 36 space the rod ends of the upper connecting linkage 28 from the lower pivot spherical rod end 30 and tongue 32, respectively, of the sulky 14, to maintain a parallel relationship between the upper connecting linkage 28 and the tongue 32 and maintain a constant horizontal alignment between the self-propelled member 12 and the sulky 14 of the vehicle 10 by preventing up or down movement (i.e., pitch rotation) about a horizontal transverse pivot axis (not shown) between the frame 20 and sulky 14.

The front spherical rod end of the upper connecting linkage 28 and the lower pivot spherical rod end 30 are axially aligned on the column 34 so as to permit the frame 20 and sulky 14 to rotate about a vertical pivot axis "B" of the mechanism 22 to enable the vehicle 10 to be steered right or left (i.e., yaw rotation). The rear spherical rod end of the upper connecting linkage 28 permits the frame 20 to rotate about a horizontal pivot axis defined by the tongue 32 (represented as coinciding with the longitudinal centerline "A" of the mechanism 22) through the lower pivot spherical rod end 30 located at the bottom of the column 34 to enable lateral rotation (i.e., roll rotation) of the frame 20 and the sulky 14 to maintain stability and wheel-to-ground contact while traveling over uneven surfaces. The spacing between the spherical rod ends of the upper connecting linkage 28 limit the degrees of roll rotation. Two stops (not shown) may be welded or otherwise secured to the frame 20 on opposite sides of the column 34 to limit the degree of yaw rotation between the frame 20 and sulky 14 about the column 34, and limit the degree of roll rotation about the longitudinal centerline "A" through the spherical rod end 30 when at a maximum degree of yaw rotation.

Figure 8:
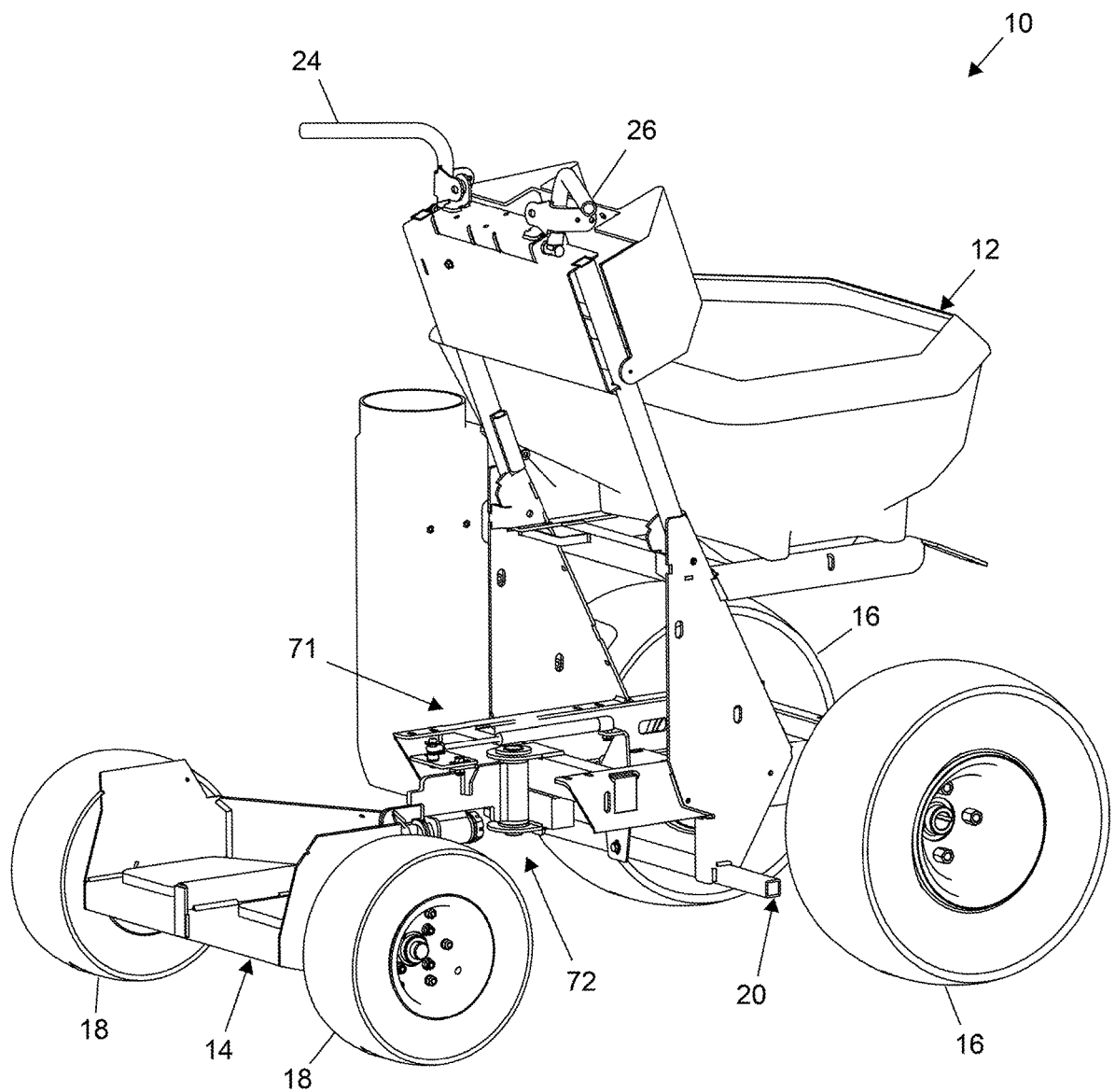
FIG. 8 is a perspective view schematically representing a vehicle having a self-propelled front member, a trailing rear member, and a steering assistance system in accordance with a third nonlimiting embodiment of this invention.
Figure 9:
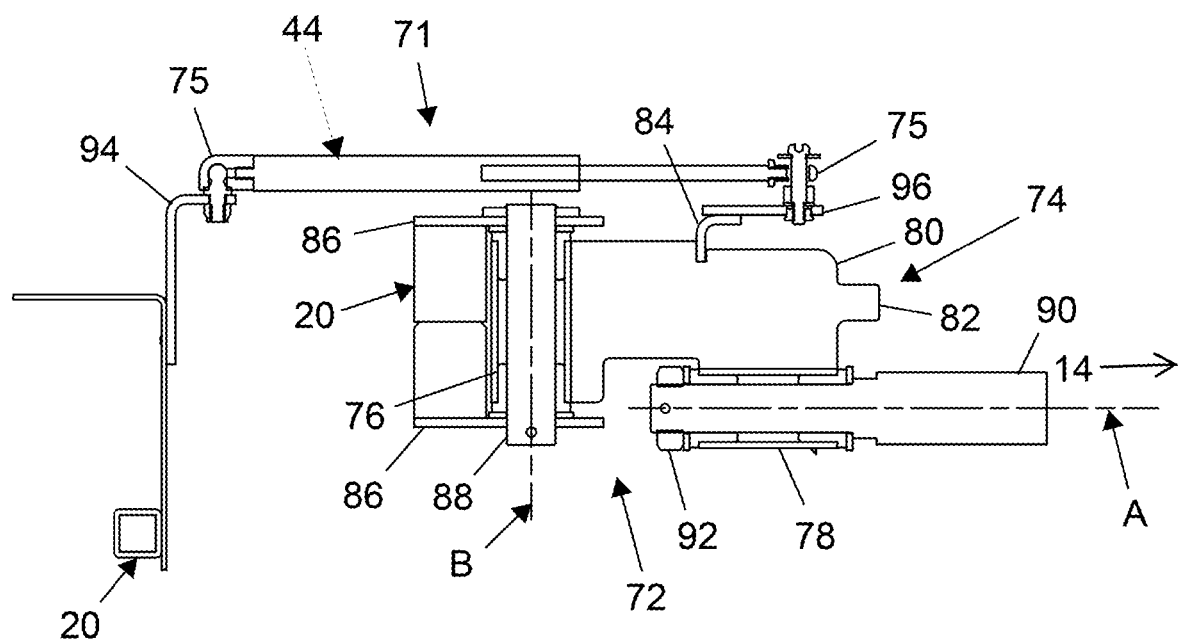
FIG. 9 is a side view of the steering assistance system and an articulating joint mechanism coupling the front and rear members of the vehicle of FIG. 8.

FIGS. 8 through 11 represent the vehicle 10 as having a knuckle-type articulating joint mechanism 72 coupling the self-propelled member 12 and the sulky 14 rather than the dual column-type articulating joint mechanism 22 discussed above. Referring to FIG. 9, the articulating joint mechanism 72 includes a knuckle weldment 74 having a vertical pivot tube 76 with bearings therein, a horizontal pivot tube 78 with bearings therein, and a connecting web 80 which may include a knuckle tab 82 and a bracket 84. The vertical pivot tube 76 is rotatively secured to brackets 86 by a bolt or pin 88. These brackets 86 are welded to the frame 20 such that the center axis of the vertical pivot tube 76 defines a vertical pivot axis "B" of the mechanism 72 that is vertically aligned with the longitudinal axis of the vehicle 10, which can be taken as coinciding with the longitudinal centerline "A" of the mechanism 72. The connection between the brackets 86 and the vertical pivot tube 76 provides rotation in yaw directions between the self-propelled member 12 and sulky 14.

A stub axle 90 protrudes from the sulky 14 (rather than the tongue 32 of FIGS. 1-7) and is axially aligned along the longitudinal axis of the vehicle 10 (coinciding with the longitudinal centerline "A" of the mechanism 72). The horizontal pivot tube 78 is rotatively secured to the stub axle 90 by a castle nut 92 and a cotter pin (not shown). This connection enables the self-propelled member 12 and the sulky 14 to roll laterally in relationship to one another while the knuckle weldment 74 maintains constant horizontal alignment between the self-propelled member 12 and the sulky 14. Two stops (not shown) may be welded or otherwise secured to either side of brackets 86 to limit the degree of yaw of the frame 20 and sulky 14 about the vertical pivot tube 76, and limit the degree of roll rotation of the horizontal pivot tube 78 about the stub axle 90 when at a maximum degree of yaw rotation.

Although steering assistance and roll control systems are discussed below in reference to particular vehicles 10 having particular types of articulating joint mechanisms (i.e., dual column-type and knuckle-type), it should be understood that the systems disclosed herein are applicable to other types of vehicles and other types of articulating joint mechanisms.

Steering assistance is provided to the vehicles 10 by steering assistance systems 40, 53, and 71 described below as each having a biasing unit 44 configured to bias the articulating joint mechanism 22 or 72 toward alignment with its longitudinal centerline "A," i.e., aligned with the longitudinal axis of the vehicle 10 when the self-propelled member 12 and sulky 14 are in the straight-line arrangement. Various components may be used as the biasing unit 44 including but not limited to gas, elastomeric, or mechanical spring, and hydraulic strut assemblies.

Although the steering assistance systems 40, 53, and 71 are represented as including a single biasing unit 44, two or more biasing units 44 may be included for steering assistance. Further, the one or more biasing units 44 may be located in various locations relative to the articulating joint mechanism 22 or 72. For example, one or more biasing units 44 may be located above or below the articulating joint mechanism 22 or 72 or its components (for example, between the upper connecting linkage 28 and the lower pivot spherical rod end 30) or a combination thereof. Although not shown, guards and/or seals may be included to provide protection for the biasing unit 44.

Regardless of the type of biasing unit 44 used, the steering assistance systems 40, 53, and 71 and/or their corresponding biasing unit 44 is preferably vertically aligned with and parallel to the longitudinal centerline "A" of the articulating joint mechanism 22 and the longitudinal axis of the vehicle 10.

The longitudinal length of the steering assistance systems 40, 53, and 71 and/or their corresponding biasing unit 44 may be centered directly under or over the vertical pivot axis "B" of the articulating joint mechanism 22 or 72, or may be offset forward or rearward along the longitudinal axis of the vehicle 10 such that a greater portion of the length of the steering assistance system 40, 53, or 71 and/or their corresponding biasing unit 44 is located on one side of the vertical pivot axis "B" of the articulating joint mechanism 22 or 72 relative to the other side. Although not shown, the steering assistance systems 40, 53, and 71 and/or the vehicle 10 may include structure suitable for facilitating repositioning or adjusting of the steering assistance systems 40, 53, and 71 and/or their corresponding biasing unit 44.

In a first nonlimiting embodiment represented in FIGS. 1 through 4, the vehicle 10 includes the dual column-type articulating joint mechanism 22 and the steering assistance system 40. The biasing unit 44 is a gas strut assembly 44 (i.e., gas spring) that includes a rod 50, cylinder 52 for receiving the rod 50, and a gas contained within the cylinder 52 which applies an extension force on the rod 50 such that the gas strut assembly 44 is preferentially in an expanded configuration, that is, when the rod 50 is pushed into the cylinder 52 by an outside force, a biasing force is applied and once the outside force is removed or overcome by the counteracting biasing force, the rod 50 is expelled from the cylinder 52 until it has returned to the expanded configuration.

Referring to FIG. 2, the steering assistance system 40 includes ball joint linkages 42 or other linkages welded or threaded on each end of the gas strut assembly 44. These linkages 42 may be coupled to the self-propelled member 12 or the sulky 14 by various components. For example in FIGS. 1 through 3, one of the linkages 42 is coupled to the frame 20 via a bracket 46 bolted to the frame 20. Similarly, the other of the linkages 42 is coupled to the tongue 32 via a bracket 48. With such arrangement, the steering assistance system 40 spans the articulating joint mechanism 22 and is capable of swiveling and/or rotating via the ball joint linkages 42 as the frame 20 and the tongue 32 rotate about a vertical pivot axis "B." Other means for coupling the gas strut assembly 44 to the self-propelled member 12 and the sulky 14 are foreseeable and within the scope of the invention; however it is preferred that the connecting means provides the freedom of movement described above.

Figure 3:
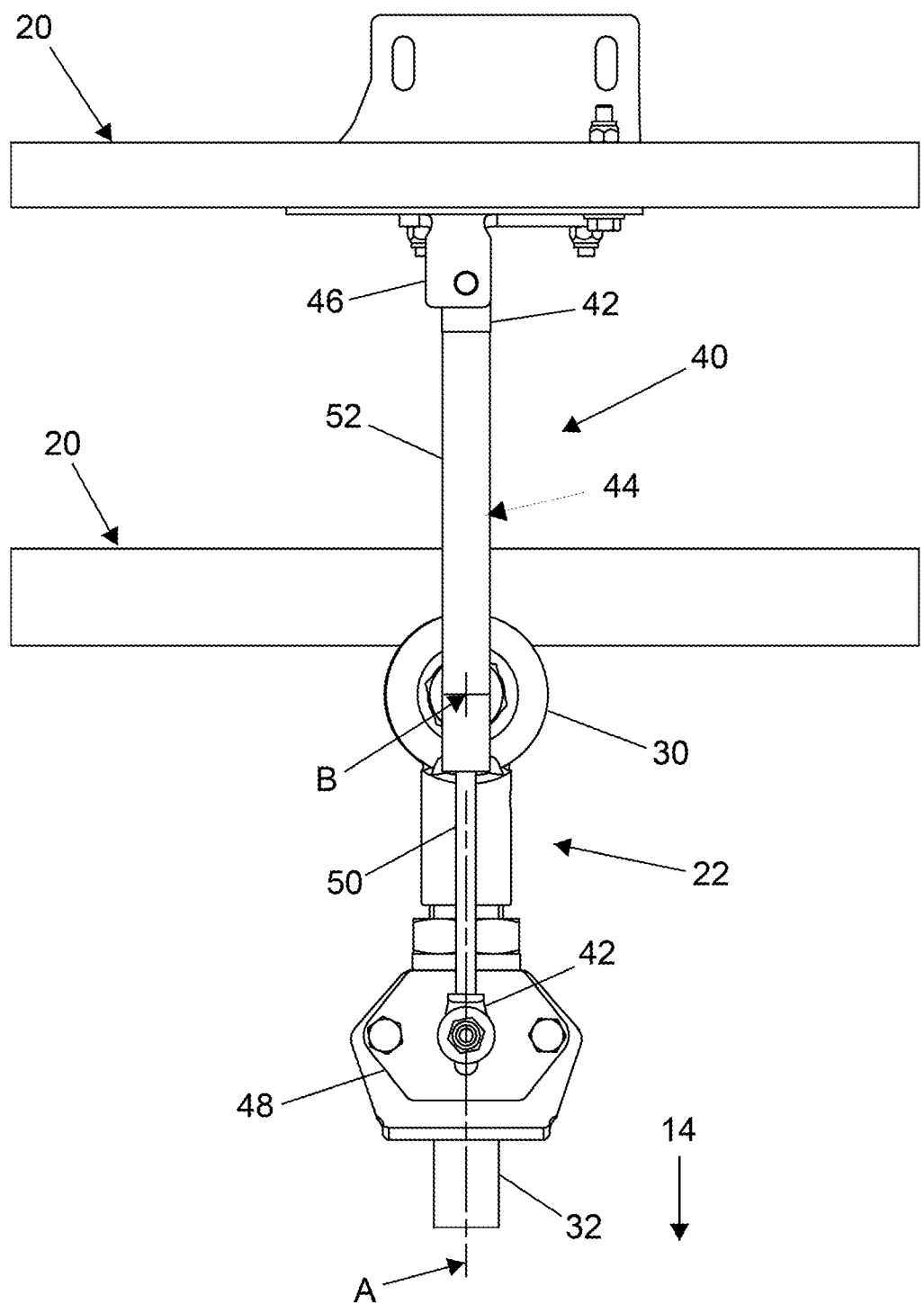
FIG. 3 is a bottom view from below the components of FIG. 2 representing the orientation of the steering assistance system while the vehicle is moving in a straight-line forward direction.

Referring to FIG. 3, when the vehicle 10 is moving forward or rearward, the gas strut assembly 44 may be partially or fully extended (e.g., in the expanded configuration) vertically aligned under the longitudinal centerline "A" of the articulating joint mechanism 22 and the longitudinal axis of the vehicle 10 such that a center longitudinal axis of the biasing unit 44 intersects the vertical pivot axis "B" of the articulating joint mechanism 22. In this position, the steering assistance system 40 preferably applies no steering input to the vehicle 10.

Figure 4:
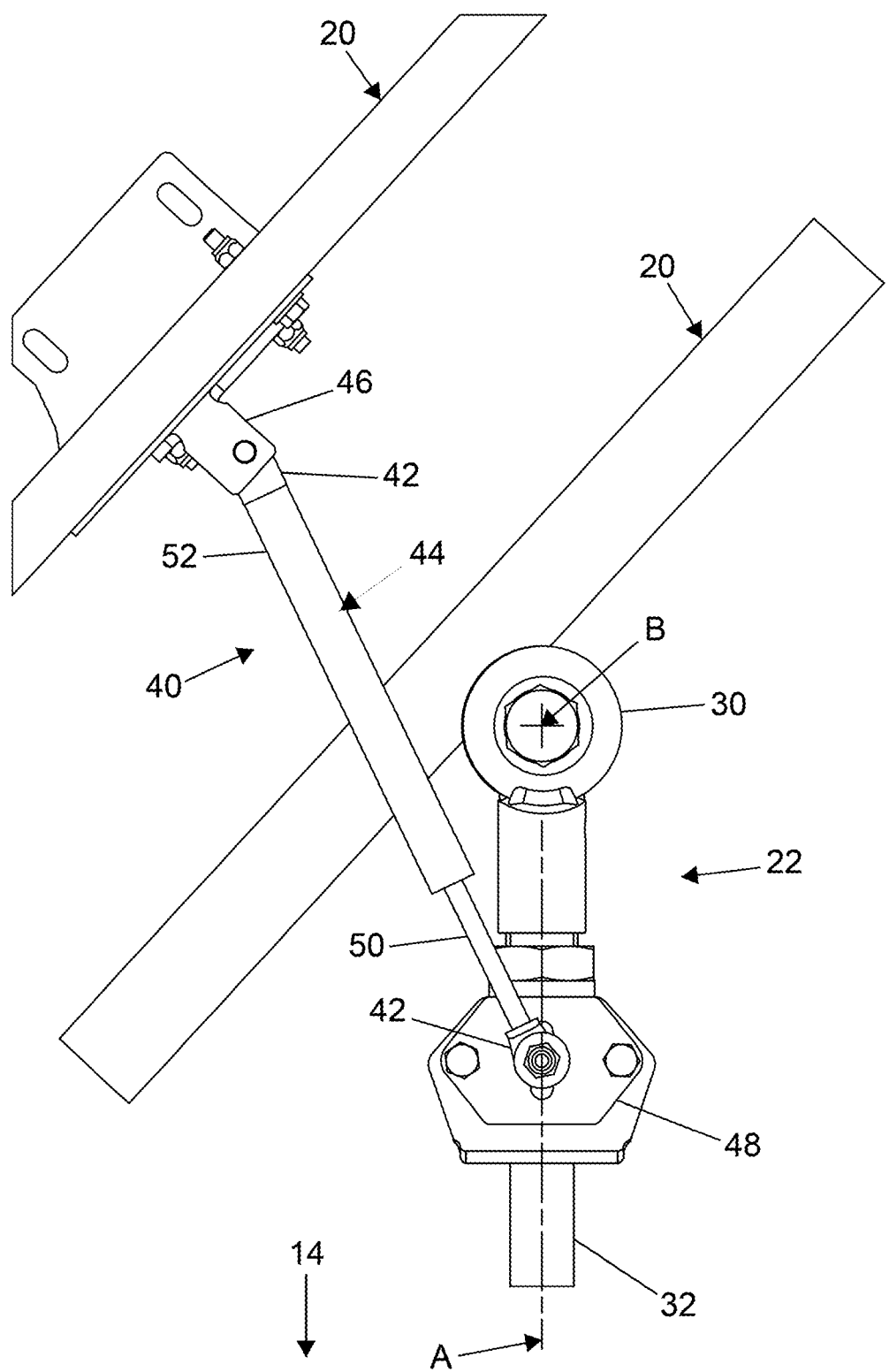
FIG. 4 is a bottom view from below the components of FIG. 2 representing the orientation of the steering assistance system while the vehicle is making a right-hand turn.

Referring to FIG. 4, when the vehicle 10 is moving in a straight-line forward direction and the operator manually turns the handle bars 24 and 26 to make a right-hand turn, the frame 20 pivots (yaws) clockwise about the vertical pivot axis "B" of the articulating joint mechanism 22 causing the sulky 14 to pivot (yaw) counter clockwise about the vertical pivot axis "B." This pivoting motion decreases the length of the gas strut assembly 44 by pushing the rod 50 into the cylinder 52 and generating a counteracting biasing force based on the pressure rating of the gas strut assembly 44. This biasing force automatically and actively counteracts and damps the steering-induced and ground-induced yaw forces thereby assisting the operator to prevent the vehicle 10 from turning too sharply.

When the operator manually turns the handle bars 24 and 26 to end the right-hand turn such that the vehicle 10 moves straight forward, the frame 20 pivots (yaws) counterclockwise about the vertical pivot axis "B" of the articulating joint mechanism 22 causing the sulky 14 to pivot (yaw) clockwise about the vertical pivot axis "B." This pivoting motion allows the gas strut assembly 44 to increase its length such that the rod 50 extends from the cylinder 52 at a force based on the pressure rating of the gas strut assembly 44 to automatically and actively assist the operator to return the vehicle 10 to the straight-line forward direction of travel. It should be understood that the steering assistance system 40 operates in a similar manner when entering and exiting a left-hand turn and when turning while moving in a rearward direction.

As such, the steering assistance system 40 biases the self-propelled member 12, the articulating joint mechanism 22, and the sulky member 14 to remain aligned along the longitudinal centerline "A," damps pivoting of the sulky 14 relative to the self-propelled member 12 when the vehicle 10 is turning, and assists in returning the self-propelled member 12, the articulating joint mechanism 22, and the sulky member 14 into alignment with the longitudinal centerline "A" when the vehicle 10 is exiting a turn.

Figure 5:
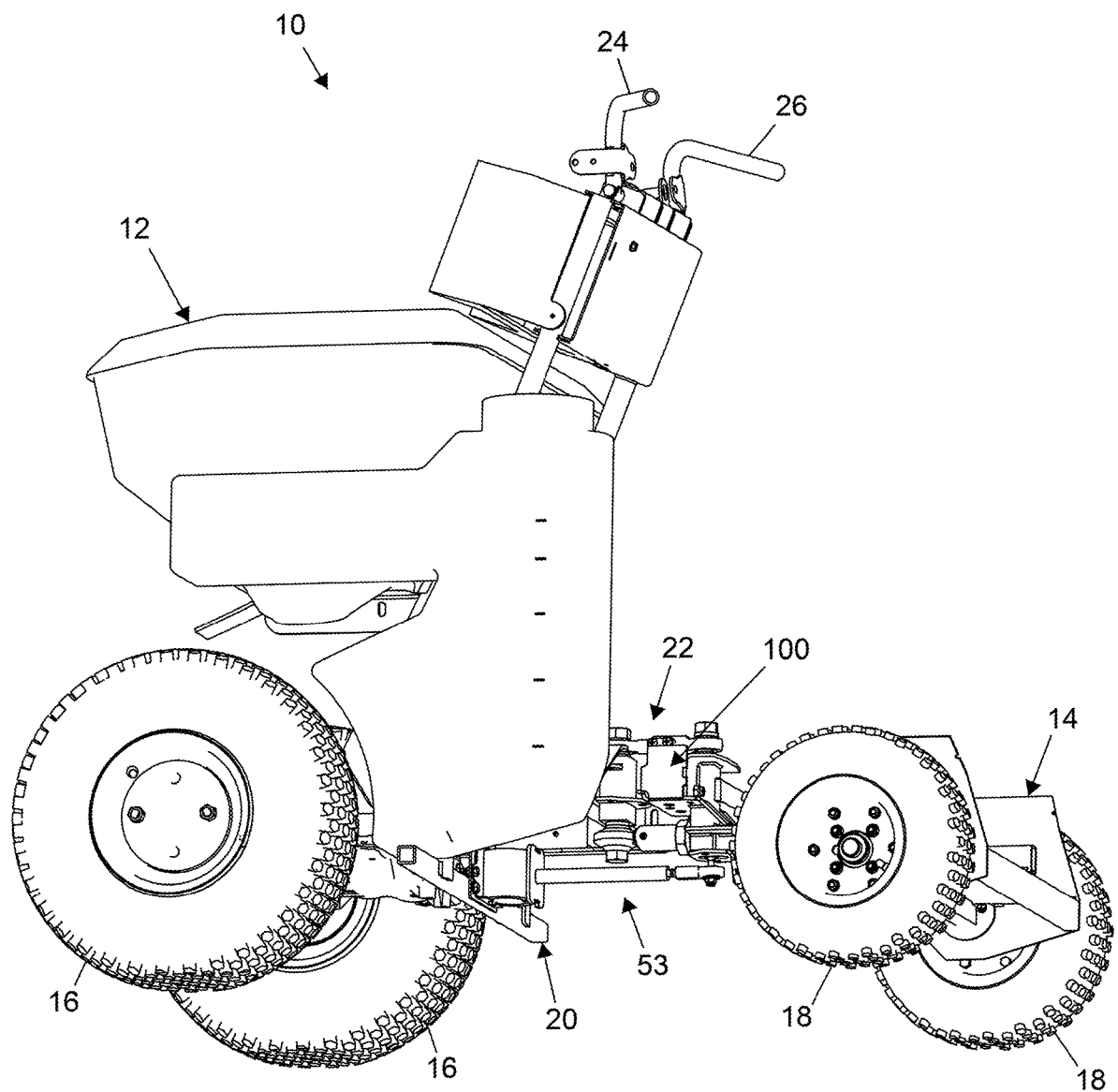
FIG. 5 is a perspective view schematically representing a vehicle having a steering assistance system in accordance with a second nonlimiting embodiment of this invention.
Figure 6:
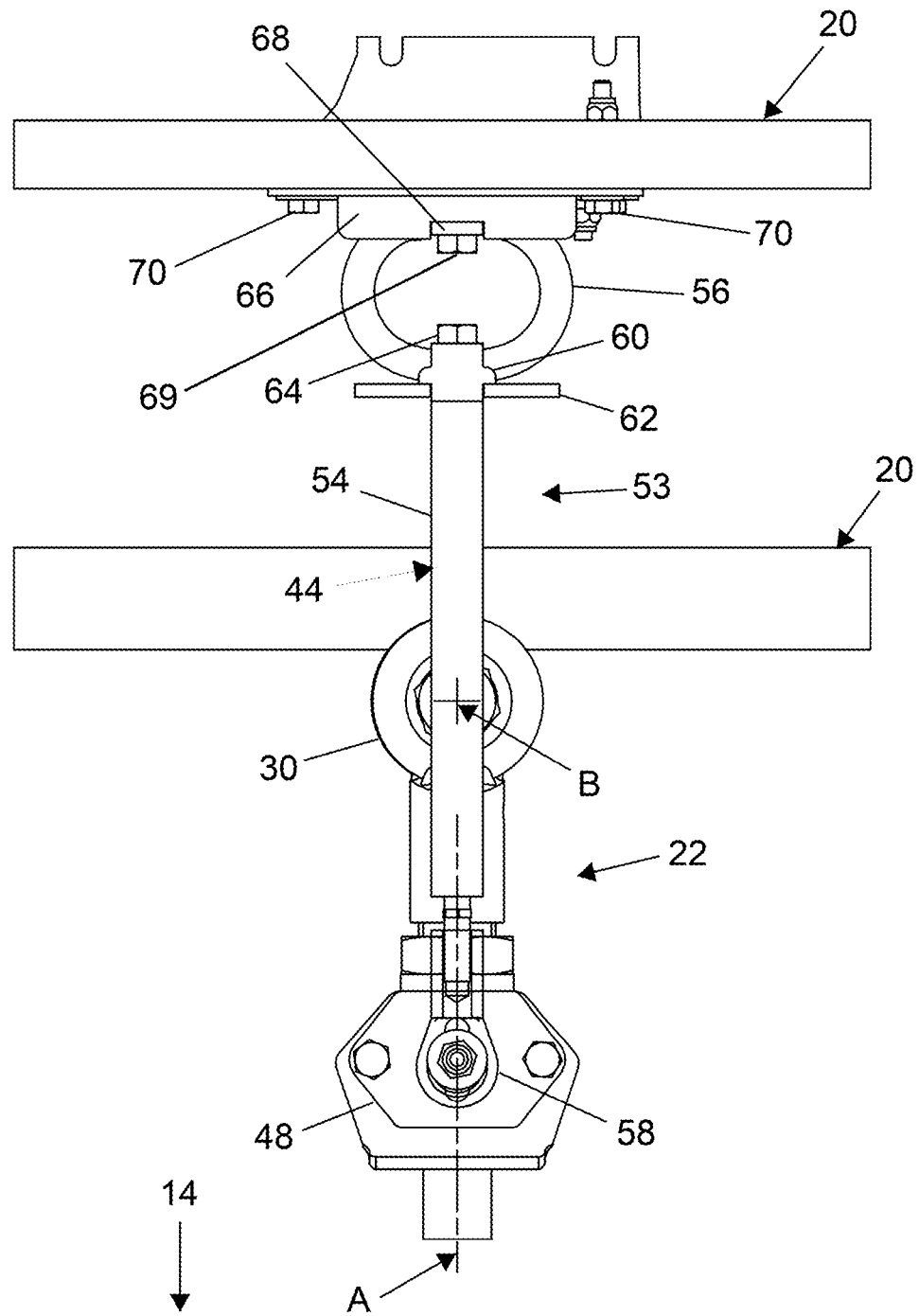
FIG. 6 is a bottom view from below the components of FIG. 5 representing the orientation of the steering assistance system while the vehicle is moving in a straight-line forward direction.
Figure 7:
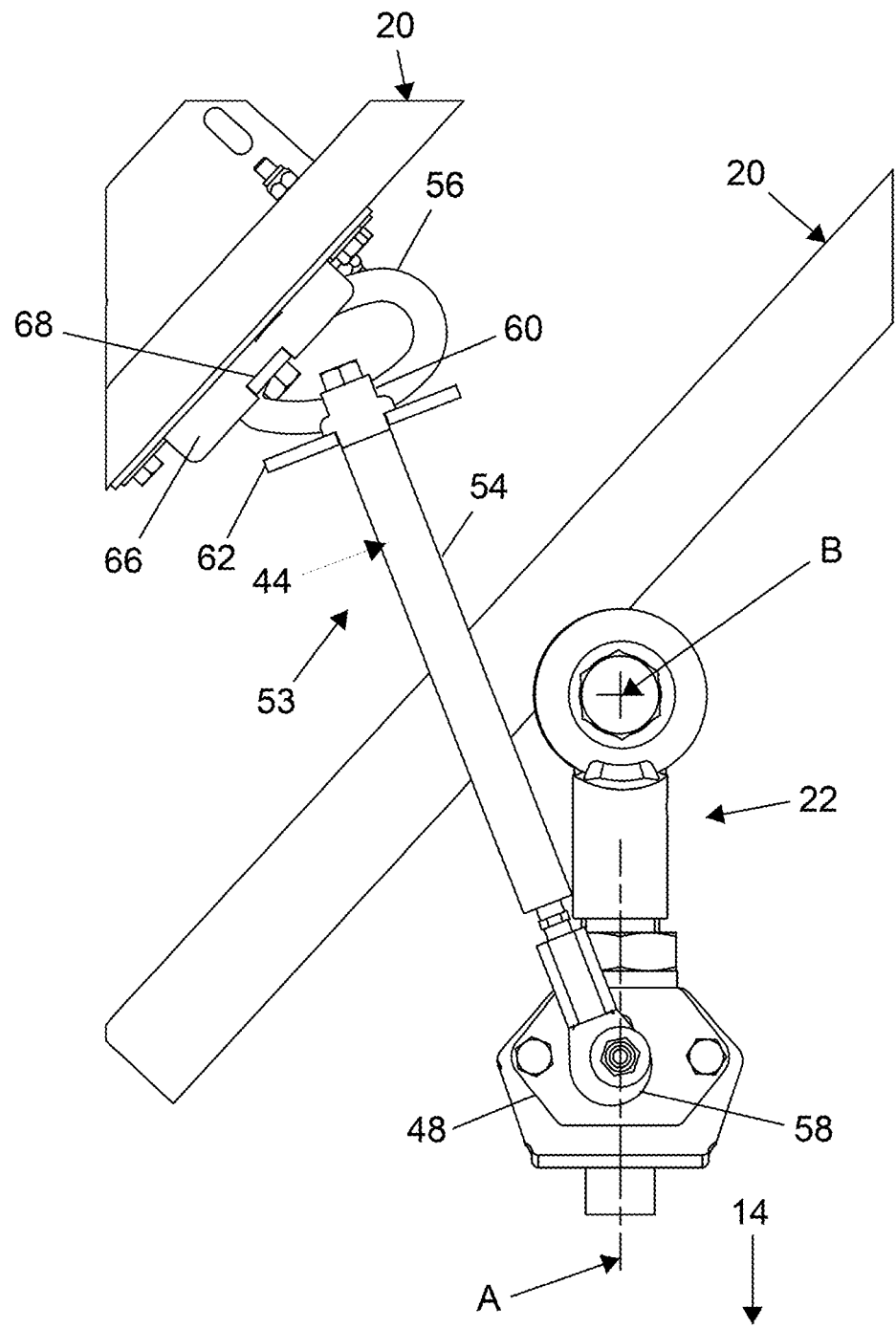
FIG. 7 is a bottom view from below the components of FIG. 5 representing the orientation of the steering assistance system while the vehicle is making a right-hand turn.

FIGS. 5 through 7 represent another embodiment wherein the vehicle 10 includes a dual column-type articulating joint mechanism 22 and the steering assistance system 53. The biasing unit 44 is an elastomeric strut assembly 44 rather than the gas strut assembly 44 of FIGS. 1 through 4.

The elastomeric strut assembly 44 includes a rod 54 with threaded ends coupled to an elastomeric radial bumper 56 at a first end and a spherical rod end 58 at a second end connected to the rod 54 to the bracket 48. A first side of the radial bumper 56 is located between an alignment plate 60 positioned on an inside of the radial bumper 56 and a pressure plate 62 positioned on an outside of the radial bumper 56. The alignment plate 60, radial bumper 56, and pressure plate 62 are secured to the rod 54 with a threaded bolt 64 such that the elastomeric strut assembly 44 is preferentially in an expanded configuration, that is, when the rod 54 is pushed against the radial bumper 56 by an outside force, a biasing force is applied and once the outside force is removed or overcome by the biasing force, the rod 54 is pushed by the radial bumper 56 until it has returned to the expanded configuration. A second side of the radial bumper 56 is located between an alignment plate 68 positioned on an inside of the radial bumper 56 and a bracket 66 located on an outside of the radial bumper 56. The alignment plate 68, radial bumper 56, and bracket 66 are secured together with a bolt and nut assembly 69, and the bracket 66 is secured to the frame 20 with bolt and nut assemblies 70.

As with the gas strut assembly 44 of FIGS. 1 through 4, the elastomeric strut assembly 44 biases the self-propelled member 12, the articulating joint mechanism 22, and the sulky member 14 to remain aligned along the longitudinal centerline "A," damps pivoting of the sulky 14 relative to the self-propelled member 12 when the vehicle 10 is turning, and assists in returning the self-propelled member 12, the articulating joint mechanism 22, and the sulky member 14 into alignment with the longitudinal centerline "A" when the vehicle 10 is exiting a turn.

Referring to FIG. 6, when the vehicle 10 is moving forward or rearward, the elastomeric strut assembly 44 vertically aligned under the longitudinal centerline "A" of the articulating joint mechanism 22 and the vehicle 10 such that a center longitudinal axis of the biasing unit 44 intersects the vertical pivot axis "B" of the articulating joint mechanism 22. In this position, the radial bumper 56 may be substantially in a relaxed or in a natural state such that the steering assistance system 53 preferably applies no steering input to the vehicle 10.

Referring to FIG. 7, when the vehicle 10 is moving in a straight-line forward direction and the operator manually turns the handle bars 24 and 26 to make a right-hand turn, the pivoting motion of the self-propelled member 12 and the sulky 14 decreases the length of the biasing unit 44 by pushing the rod 54 into the radial bumper 56 thereby deforming the radial bumper 56 and generating a counteracting biasing force based on the pressure rating of the radial bumper 56. This biasing force automatically and actively counteracts and damps the steering-induced and ground-induced yaw forces thereby assisting the operator to prevent the vehicle 10 from turning too sharply.

When the operator manually turns the handle bars 24 and 26 to end the right-hand turn such that the vehicle 10 moves straight forward, the pivoting motion of the self-propelled member 12 and the sulky 14 allows the elastomeric strut assembly 44 to increase its length such that the radial bumper 56 expands toward its natural state and applies a force on the rod 54 based on the pressure rating of the radial bumper 56 to automatically and actively assist the operator to return the vehicle 10 to the straight-line forward direction of travel. It should be understood that the elastomeric strut assembly 44 operates in a similar manner when the vehicle 10 enters and exits a left-hand turn and when it turns while moving in a rearward direction.

FIGS. 8 through 11 represent another embodiment wherein the vehicle 10 includes the knuckle-type articulating joint mechanism 72 and the steering assistance system 71 which, similar to the embodiment represented in FIGS. 1 through 4, includes a gas strut assembly 44 having ball joint linkages 75 as oppositely-disposed ends thereof as the biasing unit 44. In this example, the gas strut assembly 44 is located above the articulating joint mechanism 72 rather than below. One of the linkages 75 is coupled to the frame 20 via a bracket 94 bolted to the frame 20 and the other of the linkages 75 is coupled to the bracket 84 of the knuckle weldment 74 via a bracket 96.

Figure 10:
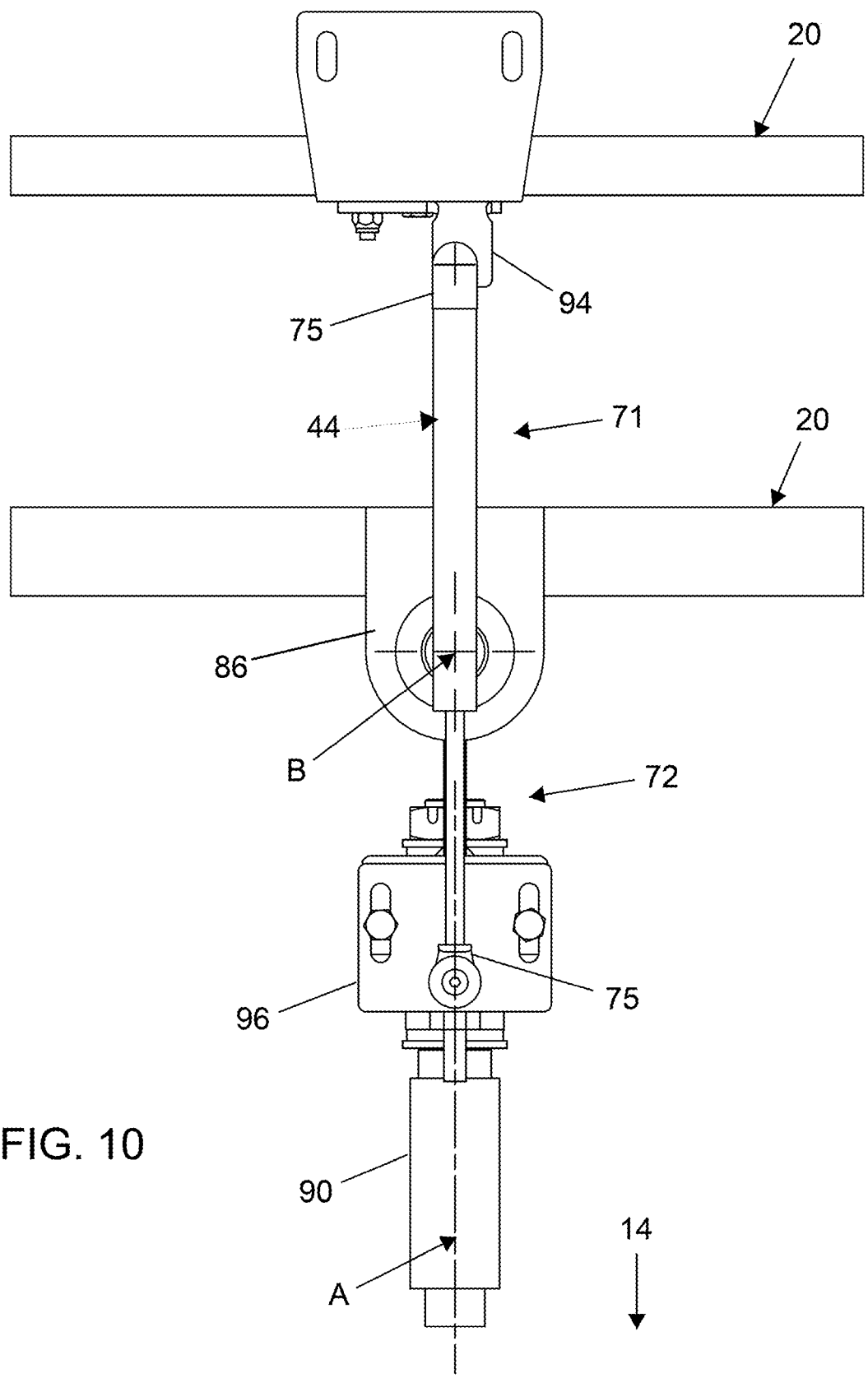
FIG. 10 is a top view from above the components of FIG. 9 representing the orientation of the steering assistance system while the vehicle is moving in a straight-line forward direction.
Figure 11:
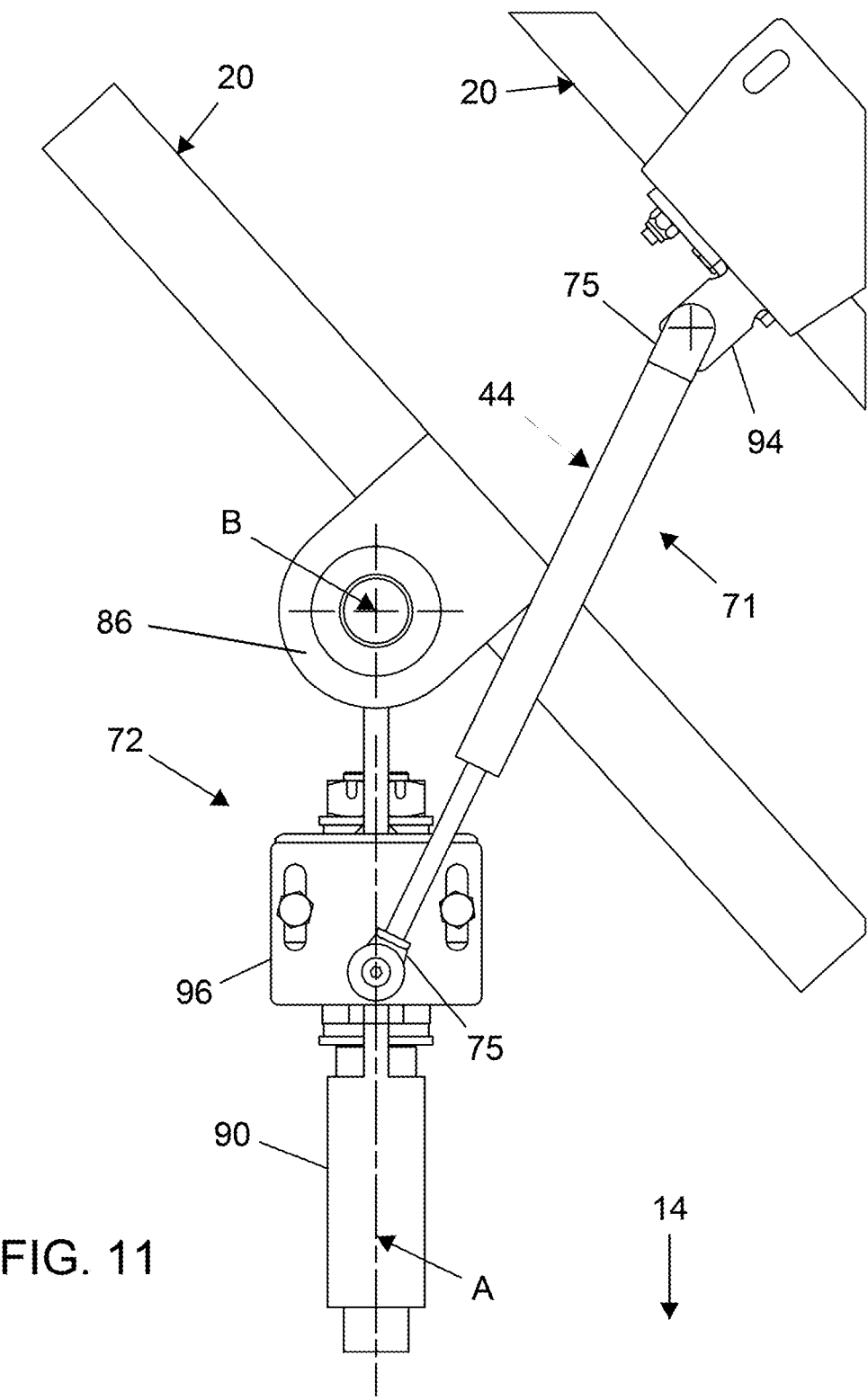
FIG. 11 is a top view from above the components of FIG. 9 representing the orientation of the steering assistance system while the vehicle is making a right-hand turn.

The steering assistance system 71 spans the articulating joint mechanism 72 and is capable of swiveling and/or rotating via the ball joint linkages 75 as the self-propelled member 12 and the sulky 14 rotate about a vertical pivot axis "B." As represented in FIGS. 10 and 11, the steering assistance system 71 of FIGS. 8 through 11 biases the self-propelled member 12, the articulating joint mechanism 72, and the sulky member 14 to remain aligned along the longitudinal centerline "A," damps pivoting of the sulky 14 relative to the self-propelled member 12 when the vehicle 10 is turning, and assists in returning the self-propelled member 12, the articulating joint mechanism 72, and the sulky member 14 into alignment with the longitudinal centerline "A" when the vehicle 10 is exiting a turn in substantially the same manner as described in reference to FIGS. 1 through 4.

Figure 12:
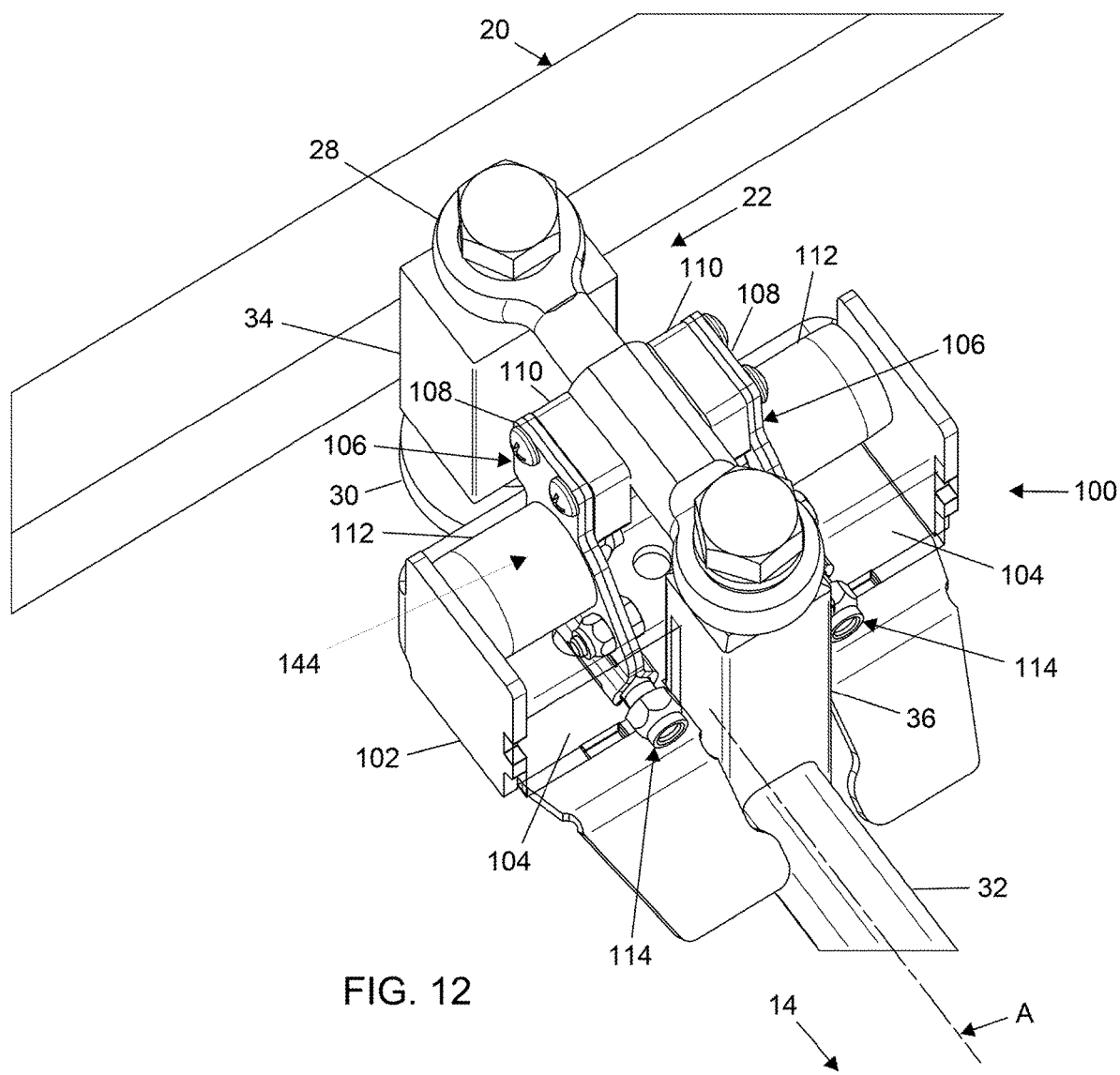
FIG. 12 is a perspective view of an articulating joint mechanism of a vehicle comprising a roll control system in accordance with a fourth nonlimiting embodiment of the invention.
Figure 13:
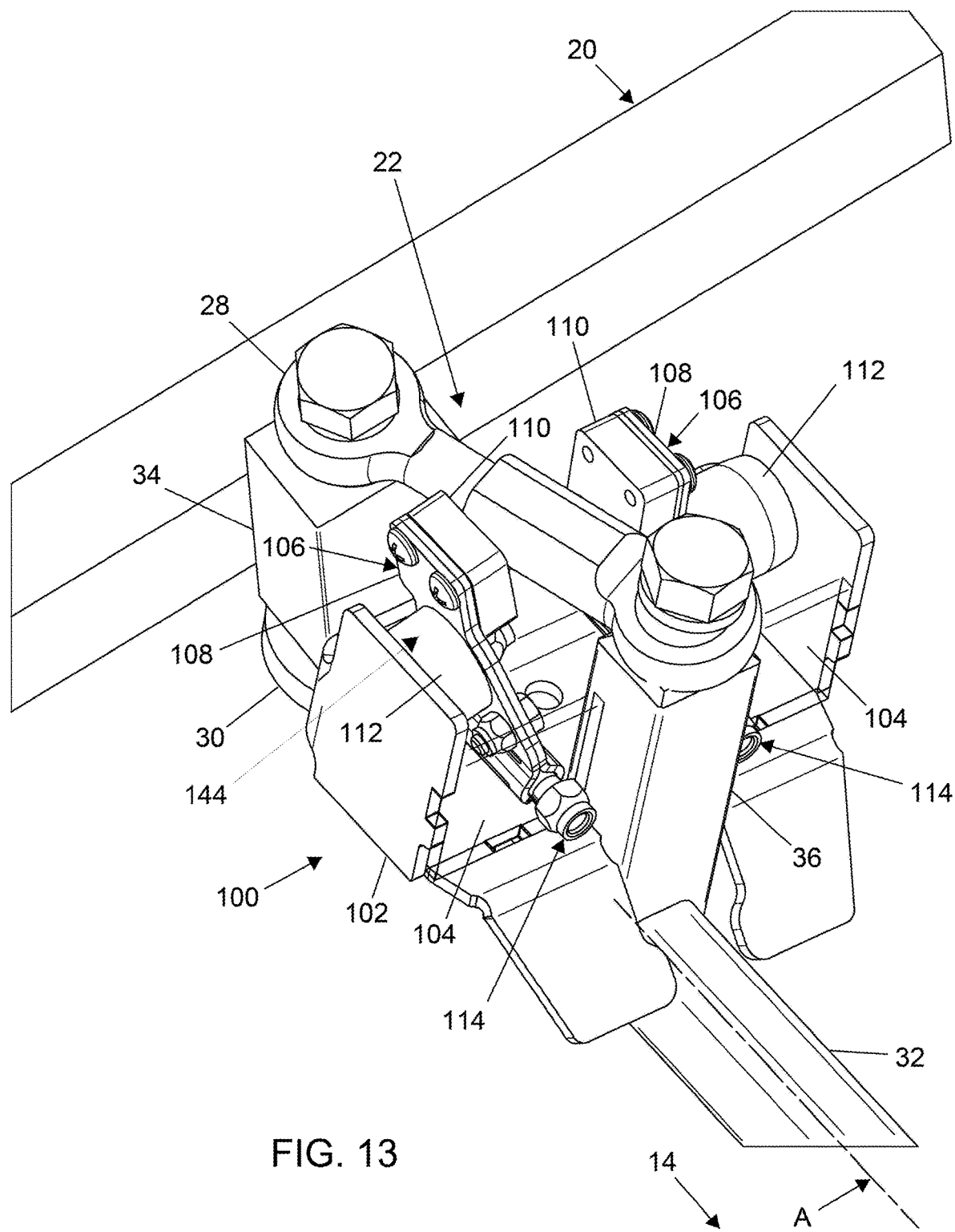
FIG. 13 is a perspective view of the components of FIG. 12 representing the orientation of the roll control system while a right front wheel of the vehicle is traveling over an obstacle.

Vehicles of the types described herein having articulating joint mechanisms, for example, the articulating joint mechanisms 22 and 72 described above, may benefit from a roll control system described below as having a biasing unit 144 configured to bias the articulating joint mechanism 22 or 72 about a horizontal pivot axis thereof to bias the self-propelled member 12 and sulky 14 toward the level alignment arrangement of the vehicle 10, i.e., when there is no roll of the self-propelled member 12 and sulky 14 relative to each other, For example, FIGS. 5, 12, 13 represent the articulating joint mechanism 22 of FIGS. 1 through 7 as including a nonlimiting roll control system 100. The steering assistance system 22 has been omitted from FIGS. 12 and 13 for clarity; however, it is within the scope of the invention that the vehicle 10 may include both the steering assistance system 22 and the roll control system 100, or may include only one of the two systems.

The roll control system 100 includes a housing 102 welded or otherwise secured to the separating column 36 and thereby fixed to the tongue 32 of the sulky 14. A rear wall 104 of the housing 102 is represented as transparent for clarity. Two forward vertical edges of the housing 102 act as stops to limit the degree of yaw and roll rotation of the sulky 14 about the column 34. The upper connecting linkage 28 is located between two articulation arm assemblies 106 that each include a rigid arm 108 having a lower end comprising a pivot tube rotatably coupled to front and rear walls of the housing 102 via a horizontal pivot 114 comprising a pin or bolt and nut extending through the pivot tube and spanning the interior of the housing 102. An oppositely disposed free end of the arms 108 includes a wear pad 110 (for example, a resistant polymer) fixed to a first side of the arm 108 facing the upper connecting linkage 28. Elastomeric axial bumpers 112 are secured to second sides of the arms 108 opposite the first sides such that the axial bumpers 112 are located between the arms 108 and side walls. In this configuration, the arms 108 are in physical contact with or capable of physical contact with exterior surfaces of the upper connecting linkage 28 via the wear pads 110 and in physical contact with or capable of physical contact with the interior surfaces of side walls of the housing 102 via the axial bumpers 112. Two stops (not shown) may be welded or otherwise secured to the frame 20 on opposite sides of the column 34 to limit the degree of yaw rotation between the frame 20 and sulky 14 about the column 34, and limit the degree of roll rotation about the longitudinal centerline "A" through the spherical rod end 30 when at a maximum degree of yaw rotation.

FIG. 12 represents a situation in which the vehicle 10 is in a level alignment arrangement, which as previously described which occurs when there is no roll of the self-propelled member 12 and sulky 14 relative to each other, e.g., when the entire vehicle 10 is resting or traveling over a flat surface, or at least the wheels 16 and 18 of the self-propelled member 12 and sulky 14 are contacting surfaces that lie in the same plane. Referring to FIG. 13, when roll occurs, for example, when the right front wheel 16 of the vehicle 10 drives over an obstacle, the self-propelled member 12 rotates (rolls) counterclockwise about a horizontal pivot axis defined by the tongue 32 (represented as coinciding with the longitudinal centerline "A" of the mechanism 22) through the lower pivot spherical rod end 30. The upper connecting linkage 28 rotates counterclockwise about the column 36 applying a force through the lefthand wear pad 110 (relative to the orientation of FIG. 12) that causes the lefthand articulation arm assembly 106 to pivot counterclockwise about the corresponding pivot 114 forcing the corresponding axial bumper 112 to compress against the interior surface of the lefthand side wall of housing 102. The compression of the axial bumper 112 provides a counteracting biasing force resisting the rotation of the self-propelled member 12 relative to the sulky 14. This counteracting biasing force, created as a result of the interaction of the housing 102 and articulation arm assembly 106 functioning as the biasing unit 144, increases as the degree of roll increases, further compressing the axial bumper 112 and assisting the operator by biasing and damping the forces as the roll commences and actively assisting the operator in returning the vehicle load to a position balanced vertically above the longitudinal axis of the vehicle 10 and perpendicular to the ground surface. In the event that the front lefthand wheel 16 drives over an obstacle, the self-propelled member 12 rotates clockwise about the longitudinal centerline "A" and the roll control system 100 will operate in a similar manner as described above but in the opposite direction, that is, the right-hand articulation arm assembly 106 provides the biasing and damping force.

Figure 14:
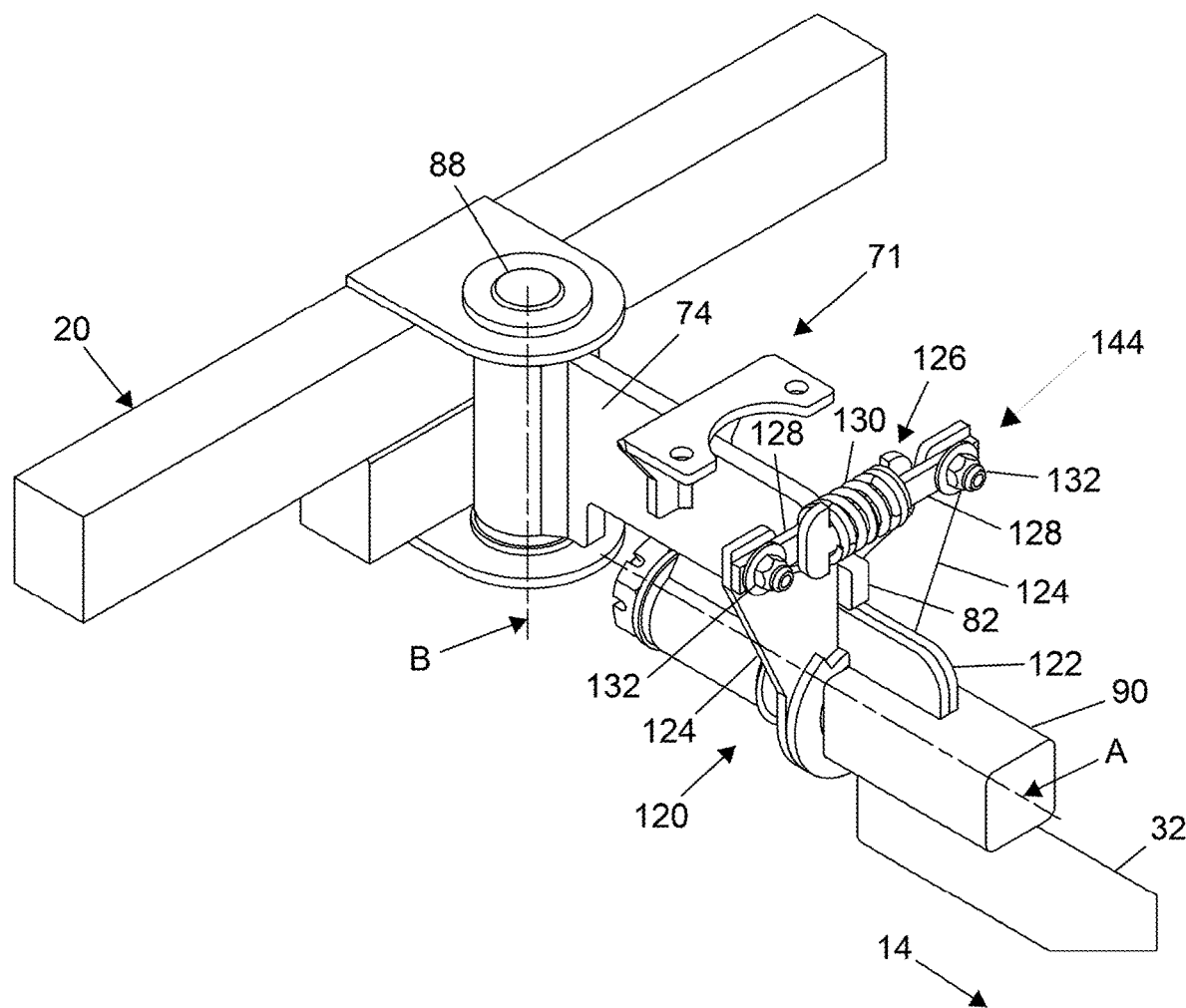
FIG. 14 is a perspective view of an articulating joint mechanism of a vehicle comprising a roll control system in accordance with a fifth nonlimiting embodiment of the invention.
Figure 15:
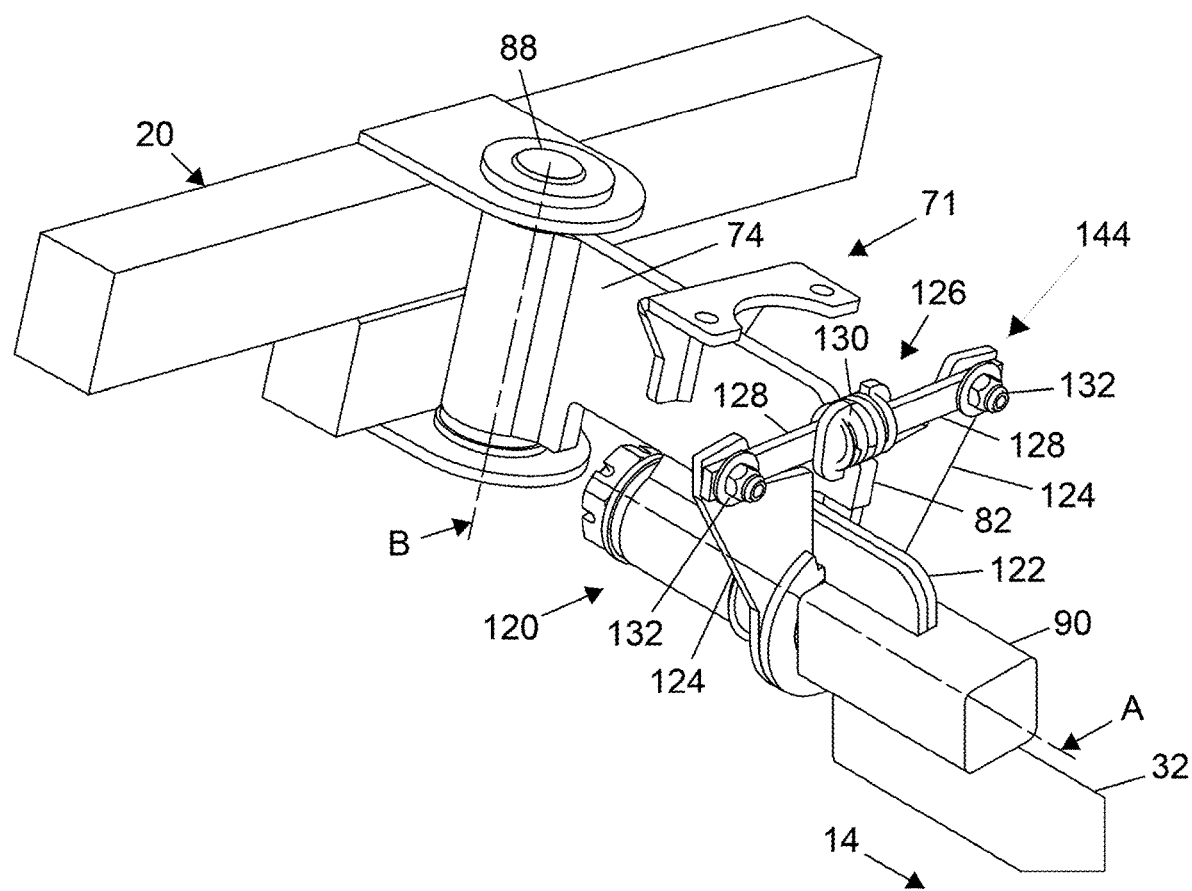
FIG. 15 is a perspective view of the components of FIG. 14 representing the orientation of the roll control system while a left front wheel of the vehicle is traveling over an obstacle.

In another example, FIGS. 14 and 15 represent the knuckle-type articulating joint mechanism 72 of FIGS. 8 through 11 as including a nonlimiting roll control system 120. Again, the steering assistance system 71 has been omitted from these drawings for clarity; however, it is within the scope of the invention that the vehicle 10 may include both the steering assistance system 71 and the roll control system 120, or may include only one of the two systems.

In this example, an actuation tab 122 is welded or otherwise fixed to the stub axle 90 such that the tab 122 is in vertical alignment along the longitudinal centerline "A" and preferably extending under the knuckle tab 82. A pair of vanes 124 are located on opposite sides of the knuckle tab 82 and have lower ends that are rotatably coupled to and axially aligned on a bearing (not shown) which is secured to and axially aligned on the stub axle 90. Each of the vanes 124 contacts one of the lateral sides of both the knuckle tab 82 and the actuation tab 122. The upper ends of the vanes 124 are coupled with a spring assembly 126 that includes a pair of spring clips 128 with an expanded head on one end and a hole on the opposite end. The spring clips 128 are loosely secured to their corresponding vane 124 by pins or bolts 132 which pass through the holes in the ends of the spring clips 128. The spring clips 128 each pass axially through the center of a compression spring 130 such that the spring 130 is located between and retained on the spring clips 128 by the expanded heads on ends thereof. The spring assembly 126 provides tension to bias the knuckle tab 82 and the actuation tab 122, and thereby bias the self-propelled member 12 and the sulky 14, in a horizontal alignment with each other such that the vehicle load is preferentially balanced above the longitudinal axis of the vehicle 10 and perpendicular to the surface of the ground. As an alternative to the spring assembly 126, an extension spring could be coupled to holes in the vanes 124.

Referring to FIG. 15, when roll occurs, for example, when the left-hand front wheel 16 drives over an obstacle, the left-hand self-propelled member 12 rotates clockwise about the axis of the stub axle 90. During this rotation, the left-hand vane 124 is held in the vertical position by the actuation tab 122 while the knuckle tab 82 simultaneously rotates clockwise about the stub axle 90 forcing the right-hand vane 124 to rotate clockwise therewith. The distance between the upper ends of the pair of vanes 124 is increased thereby extending the spring assembly 126 as the heads of the spring clips 128 pull apart and compress the spring 130. The compression of the spring 130 provides a counteracting biasing force resisting the rotation of the self-propelled member 12 relative to the sulky 14. This counteracting biasing force, created as a result of the interaction of the vanes 124 and spring assembly 126 functioning as the biasing unit 144, increases as the degree of roll increases, further compressing the spring 130 and assisting the operator by damping the forces as the roll commences and actively assisting the operator in returning the vehicle load to a position balanced vertically above the longitudinal axis of the vehicle 10 and perpendicular to the ground surface. Similarly, if the right-hand front wheel 16 drives over an obstacle, the roll control system 120 operates to a similar manner as described above but in the opposite direction, that is, the left-hand vane 124 rotates counterclockwise with the knuckle tab 82 causing the spring 130 to compress and provide the biasing and damping force.

In the above examples, the roll control systems 100 and 120 automatically and actively biases the articulating joint mechanisms 22 and 72 to maintain or promote a lateral horizontal alignment between the self-propelled member 12 and the sulky 14 and thereby bias the vehicle's load to remain or return to a position balanced above the longitudinal axis of the vehicle 10 and perpendicular to the ground surface. Furthermore, the roll control systems 100 and 120 are capable of damping roll initiated by the sulky 14, for example, if one of the rear wheels 18 drives over an obstacle or if the operator's body weight is not perpendicular to the platform of the sulky 14. It is also foreseeable that an operator could shift his or her body weight, which is then transferred from the sulky 14 to the self-propelled member 12 through the roll control system 100 or 120, to actively counter undesired roll and thereby promote contact by all four wheels on the ground, or otherwise improve steering control, traction, and/or lateral stability.

In view of the above, it can be seen that the steering assistance systems 40, 53, and 71 and roll control systems 100 and 120 as described above are capable of providing simple, automatic, and inexpensive steering assistance and control of unwanted roll, respectively, and in so doing are capable of promoting the stability, safety, and control to a vehicle. In addition, the elastomeric strut assembly 44 as described above may be used to replace other types of struts used on a vehicle.

Vehicles of the type described herein may include the steering assistance systems 40, 53, or 71 and/or the roll control systems 100 or 120 while also including or retaining other systems known in the art, such as the aforementioned Perma-Green Stand-on Triumph with synchronized two-lever drive-steering control system. For example, the steering assistance systems 40, 53, and 71, the roll control systems 100 and 120, and the elastomeric strut assembly 44 could be used with or make use of the articulating joint mechanism and other features disclosed in U.S. Pat. No. 6,336,600, spray rates synchronized to multiple ground speeds and other features disclosed in U.S. Pat. No. 7,954,573, and/or other conventional features commonly found on such vehicles, including but not limited to service and parking brakes, neutral lock-out switches, drop-down handle bars, etc.

Therefore, while the invention has been described in terms of specific embodiments, it is apparent that other forms could be adopted by one skilled in the art. For example, the physical configuration of the vehicle 10, articulating joint mechanisms 22 and 72, steering assistance systems 40, 53, and 71 and their corresponding biasing units 44, and roll control systems 100 and 120 and their corresponding biasing units 144 could differ in appearance and construction from the embodiments described and shown in the figures, and various materials could be used in their fabrication. In addition, the invention encompasses additional embodiments in which one or more features or aspects of disclosed embodiments may be omitted or one or more features or aspects of different disclosed embodiments may be combined. Accordingly, it should be understood that the invention is not necessarily limited to any embodiment described herein or shown in the figures. It should also be understood that the phraseology and terminology employed above are for the purpose of describing the disclosed embodiments, and do not necessarily serve as limitations to the scope of the invention. Therefore, the scope of the invention is to be limited only by the following claims.

The invention claimed is:

1. A steering assistance system for a vehicle comprising first and second wheeled members coupled together by an articulating joint mechanism having a longitudinal centerline aligned with a longitudinal axis of the vehicle when the first and second wheeled members are in a straight-line arrangement as a result of the vehicle tracking in a straight-line forward direction, the articulating joint mechanism having a vertical pivot axis disposed on the longitudinal centerline thereof that enables the first and second wheeled members to articulate relative to each other in oppositely-disposed first and second yaw directions relative to the longitudinal axis of the vehicle, the steering assistance system comprising:
    a biasing unit;
    a first linkage operably attaching the biasing unit to the first wheeled member forward of the vertical pivot axis of the articulating joint mechanism; and
    a second linkage operably attaching the biasing unit to the second wheeled member rearward of the vertical pivot axis;
    wherein the first and second linkages position the biasing unit to span the articulating joint mechanism and the vertical pivot axis of the articulating joint mechanism such that a longitudinal axis of the biasing unit is vertically aligned with the longitudinal axis of the vehicle, the longitudinal centerline of the articulating joint mechanism and the vertical pivot axis of the articulating joint mechanism when the first and second wheeled members are in the straight-line arrangement thereof;
    wherein when the articulating joint mechanism pivots about the vertical pivot axis thereof in either of the first and second yaw directions, the longitudinal axis of the biasing unit is no longer vertically aligned with the longitudinal centerline of the articulating joint mechanism and a distance between the first and second linkages is reduced thereby compressing the biasing unit to thereby apply a counteracting force to the first and second wheeled members to bias the first and second wheeled members toward the straight-line arrangement thereof.

2. The steering assistance system of claim 1, wherein the first linkage couples the biasing unit at a first end thereof to the first wheeled member of the vehicle and the second linkage couples the biasing unit at a second end thereof to the second wheeled members of the vehicle.

3. The steering assistance system of claim 1, wherein the biasing unit includes a gas strut assembly that is compressed when the distance between the first and second linkages is reduced.

4. The steering assistance system of claim 1, wherein the biasing unit includes an elastomeric, mechanical spring, or hydraulic strut assembly that is compressed when the distance between the first and second linkages is reduced.

5. The steering assistance system of claim 1, wherein the articulating joint mechanism is a dual column-type articulating joint member capable of pivoting in the first and second yaw directions and oppositely-disposed first and second roll directions.

6. The steering assistance system of claim 1, wherein the articulating joint mechanism is a knuckle-type joint having a knuckle-type articulating joint member capable of pivoting in the first and second yaw directions and oppositely-disposed first and second roll directions.

7. The steering assistance system of claim 1, further comprising means for limiting yaw rotation between the first and second wheeled members.

8. A roll control system for a vehicle comprising first and second wheeled members coupled together by an articulating joint mechanism having a longitudinal centerline aligned with a longitudinal axis of the vehicle when the first and second wheeled members are in a Straight-line arrangement as a result of the vehicle tracking in a straight-line forward direction, the articulating joint mechanism having a vertical pivot axis disposed on the longitudinal centerline thereof that enables the first and second wheeled members to articulate relative to each other in oppositely-disposed first and second yaw directions relative to the longitudinal axis of the vehicle, the articulating joint mechanism having a horizontal pivot axis disposed on the longitudinal centerline thereof that enables the first and second wheeled members to rotate relative to each other in oppositely-disposed first and second roll directions around the longitudinal axis of the vehicle and relative to a level alignment arrangement of the vehicle, the roll control system comprising:
    a biasing unit comprising at least one biasing element;
    wherein when the articulating joint mechanism pivots about the horizontal pivot axis thereof in either of the first and second roll directions, the biasing unit applies a counteracting force to a first portion of the articulating joint mechanism to bias the first and second wheeled members toward the level alignment arrangement of the vehicle, and the counteracting force applied to the first portion of the articulating joint mechanism is based on an amount of compression of the biasing element of the biasing unit;
    wherein the biasing unit includes a pair of rotating members located on oppositely disposed sides of a second portion of the articulating joint mechanism, wherein when the articulating joint mechanism pivots in the first roll direction, the second portion of the articulating joint mechanism contacts and pushes against a first rotating member of the rotating members such that the first rotating member pivots therewith and the first rotating member applies the counteracting force to the first portion of the articulating joint mechanism to bias the first and second wheeled members toward the level alignment arrangement of the vehicle, and when the articulating joint mechanism pivots in the second roll direction, the second portion of the articulating joint mechanism contacts and pushes against a second rotating member of the rotating members such that the second rotating member pivots therewith and the second rotating member applies the counteracting force to the first portion of the articulating joint mechanism to bias the first and second wheeled members toward the level alignment arrangement of the vehicle; and
    wherein the roll control system further comprises a housing wherein the biasing element comprises first and second bumpers associated with the first and second rotating members, respectively, and when the articulating joint mechanism pivots in the first roll direction, the first bumper of the first rotating member contacts a wall of the housing and is compressed against the wall.

9. The roll control system of claim 8, wherein the articulating joint mechanism is a dual column-type articulating joint member capable of pivoting in the first and second yaw directions and the first and second roll directions and the second portion of the articulating joint mechanism is an upper connecting linkage between a pair of separating columns.

10. The roll control system of claim 8, wherein the first and second rotating members are axially aligned and coupled to one another with the biasing element therebetween comprising a pair of elongated spring clips and a compression spring, the spring clips each having a first end coupled to a corresponding one of the first and second rotating members and a second end having an enlarged head, wherein both of the spring clips pass axially through the compression spring such that the compression spring is retained between the heads of the spring clips, wherein when a distance between the first and second rotating members increases due to rotation of the articulating joint mechanism in either of the first and second roll directions, the compression spring is compressed between the heads of the spring clips, wherein the counteracting force applied to the first portion of the articulating joint mechanism to bias the first and second wheeled members toward the level alignment arrangement of the vehicle is based on an amount of compression of the compression spring.

11. The roll control system of claim 10, wherein the articulating joint member is a knuckle-type articulating joint member capable of pivoting in the first and second yaw directions and the first and second roll directions and having a knuckle tab located between the rotating members that is configured to push against the first rotating member or the second rotating member when the articulating joint member pivots in, respectively, the first and second roll directions.

12. The roll control system of claim 8, further comprising means for limiting roll rotation between the first and second wheeled members.

13. A vehicle comprising:
first and second wheeled members;
an articulating joint mechanism coupling together the first and second wheeled members; and
at least one biasing unit located along a longitudinal centerline of the articulating joint mechanism and/or along a longitudinal axis of the vehicle adjacent the articulating joint mechanism, a first linkage coupling a first end of the biasing unit to the first wheeled member of the vehicle and a second linkage coupling a second end of the biasing unit to the second wheeled member of the vehicle, wherein the first and second linkages position the biasing unit to span the articulating joint mechanism and a vertical pivot axis of the articulating joint mechanism such that a longitudinal axis of the biasing unit is vertically aligned with the longitudinal axis of the vehicle, the longitudinal centerline of the articulating joint mechanism, and the vertical pivot axis the articulating joint mechanism when the first and second wheeled members are in the straight-line arrangement thereof;
wherein when the vehicle turns as a result of the first and second wheeled members being articulated relative to each other, the longitudinal axis of the biasing unit is no longer vertically aligned with the longitudinal centerline of the articulating joint mechanism and a distance between the first and second linkages is reduced thereby compressing the biasing unit to thereby apply a counteracting force to the first and second wheeled members to bias the vehicle to travel in a straight-line forward direction.

14. The vehicle of claim 13, wherein the biasing unit includes a gas strut assembly that is compressed when the distance between the first and second linkages is reduced.

15. The vehicle of claim 13, wherein the biasing unit includes an elastomeric, mechanical spring, or hydraulic strut assembly that is compressed when the distance between the first and second linkages is reduced.

16. The vehicle of claim 13 wherein the vehicle is a front wheel-drive and/or rear-wheel drive, walk-behind or ride-on, self-propelled lawn care vehicle.

17. The vehicle of claim 13, further comprising means for limiting yaw rotation between the first and second wheeled members.

18. The vehicle of claim 13, further comprising a roll control system comprising a second biasing unit, wherein the articulating joint mechanism has a horizontal pivot axis disposed on the longitudinal centerline thereof that enables the first and second wheeled members to rotate relative to each other in oppositely-disposed first and second roll directions around the longitudinal axis of the vehicle and relative to a level alignment arrangement of the vehicle, wherein when the first and second wheeled members rotate relative to each other in either of the first and second roll directions, the second biasing unit applies a counteracting force to bias the first and second wheeled members toward the level alignment arrangement of the vehicle.

19. The vehicle of claim 18, wherein the second biasing unit includes a pair of rotating members located on oppositely disposed sides of a second portion of the articulating joint mechanism, wherein when the articulating joint mechanism pivots in either of the first and second roll directions, the second portion of the articulating joint mechanism contacts and pushes against a first rotating member of the rotating members such that the first rotating member pivots therewith and the first rotating member applies the counteracting force to the first portion of the articulating joint mechanism to bias the first and second wheeled members toward the level alignment arrangement of the vehicle.

20. The vehicle of claim 19, wherein the second biasing unit includes a biasing element that is compressed when the articulating joint mechanism pivots in either of the first and second roll directions, wherein the counteracting force applied to the first portion of the articulating joint mechanism to bias the first and second wheeled members toward the level alignment arrangement of the vehicle is based on an amount of compression of the biasing element.

21. The vehicle of claim 19, wherein a distance between the first rotating member and a second rotating member of the rotating members increases when the articulating joint mechanism pivots in either of the first and second roll directions.

22. The vehicle of claim 18, further comprising means for limiting roll rotation between the first and second wheeled members.

23. A vehicle comprising:
first and second wheeled members;
an articulating joint mechanism coupling together the first and second wheeled members, the articulating joint mechanism having a vertical pivot axis disposed on a longitudinal centerline thereof that enables the first and second wheeled members to articulate relative to each other in oppositely-disposed first and second yaw directions relative to a longitudinal axis of the vehicle, the articulating joint mechanism having a horizontal pivot axis disposed on the longitudinal centerline thereof that enables the first and second wheeled members to rotate relative to each other in oppositely-disposed first and second roll directions around the longitudinal axis of the vehicle and relative to a level alignment arrangement of the vehicle; and
a roll control system comprising a biasing unit comprising at least one biasing element, the biasing unit biasing the articulating joint mechanism when the first and second wheeled members rotate relative to each other in either of the first and second roll directions by applying a counteracting force to a first portion of the articulating joint mechanism to bias the first and second wheeled members toward the level alignment arrangement of the vehicle, and the counteracting force applied to the first portion of the articulating joint mechanism is based on an amount of compression of the biasing element of the biasing unit;

wherein the biasing unit includes a pair of rotating members located on oppositely disposed sides of a second portion of the articulating joint mechanism, wherein when the articulating joint mechanism pivots in the first roll direction, the second portion of the articulating joint mechanism contacts and pushes against a first rotating member of the rotating members such that the first rotating member pivots therewith and the first rotating member applies the counteracting force to the first portion of the articulating joint mechanism to bias the first and second wheeled members toward the level alignment arrangement of the vehicle, and when the articulating joint mechanism pivots in the second roll direction, the second portion of the articulating joint mechanism contacts and pushes against a second rotating member of the rotating members such that the second rotating member pivots therewith and the second rotating member applies the counteracting force to the first portion of the articulating joint mechanism to bias the first and second wheeled members toward the level alignment arrangement of the vehicle; and wherein the roll control system further comprises a housing wherein the biasing element comprises first and second bumpers associated with the first and second rotating members, respectively, and when the articulating joint mechanism pivots in the first roll direction, the first bumper of the first rotating member contacts a wall of the housing and is compressed against the wall.

24. The vehicle of claim 23, wherein the vehicle is a front wheel-drive and/or rear-wheel drive, walk-behind or ride-on, self-propelled lawn care vehicle.

* * * * *